US005859728A

United States Patent [19]
Colin et al.

[11] Patent Number: 5,859,728
[45] Date of Patent: Jan. 12, 1999

[54] METHOD AND APPARATUS FOR IMPROVED SPATIAL LIGHT MODULATION

[75] Inventors: Soutar Colin, Toronto, Canada; Richard D. Juday, Houston, Tex.

[73] Assignee: The United States of America as represented by the Administrator of the National Aeronautics and Space Administration, Washington, D.C.

[21] Appl. No.: 327,762

[22] Filed: Oct. 24, 1994

[51] Int. Cl.$^6$ .................................................. G02B 27/46
[52] U.S. Cl. ........................... 359/561; 359/256; 359/277
[58] Field of Search ................................ 359/256, 276, 359/277, 561

[56] References Cited

U.S. PATENT DOCUMENTS

| | | | |
|---|---|---|---|
| 2,780,958 | 2/1957 | Wiley | 88/61 |
| 3,443,857 | 5/1969 | Warter, Jr. | 350/150 |
| 3,890,035 | 6/1975 | Takeda | 350/150 |
| 3,938,878 | 2/1976 | Fox | 350/150 |
| 4,813,761 | 3/1989 | Davis et al. | 350/162.15 |
| 4,974,945 | 12/1990 | Kumada | 350/384 |
| 5,039,210 | 8/1991 | Welstead et al. | 359/36 |

OTHER PUBLICATIONS

Saleh et al, "Fundamentals of Photonics",1991, pp. 197–198.

J. L. Pezzaniti, Mueller Matrix Imaging Polarimetry, PhD. Thesis, Univ. of Alabama in Huntsville, Huntsville, AL, 1993, pp. 72–74, 98–103, 174–176 and 193–200.

J.L. Pezzaniti and R.A. Chipman, "Phase–only Modulation Of A Twisted Nematic Liquid–Crystal TV By Use Of The Eigenpolarization States", Optics Letters vol. 18, pp. 1567–1569 (Sep. 1993).

J.L. Pezzaniti, R.A. Chipman, and D.A. Gregory, "Polarization Characterization Of An LCTV With A Meuller Matrix Imaging Polarimeter", Optical Pattern Recognition IV, D. Casasent, ed., Proc. SPIE vol. 1959, pp. 235–247 (1993).

J.L. Pezzaniti, Mueller Matrix Imaging Polarimetry, PhD Thesis, University of Alabama in Huntsville, Huntsville, Alabama (1993).

Richard D. Juday, "Optimal Realizable Filters and The Minimum Euclidean Distance Principle", Applied Optics, vol. 32, No. 26, pp. 5000–5111, Sep. 10, 1993.

Richard D. Juday, R. Shane Barton, Jason Kinser, and Jennifer Lacroix Alvarez, "Efficient Code for Optimal Realizable Filter Calculation", Proc. SPIE, vol. 1959, 262–268 (1993).

R. Clark Jones, "A New Calculus for the Treatment of Optical Systems VI. Experimental Determination of the Matrix", J. of the Opt. Soc. of Am. vol. 37 #2, pp. 110–112 (1947).

Khangua Lu and Bahaa E.A. Saleh, "Theory and Design of The Liquid Crystal TV and An Optical Spatial Phase Modulator", Opt. Eng., vol. 29 #3, pp. 240–246 (1990).

*Primary Examiner*—Georgia Y. Epps
*Assistant Examiner*—Thomas Robbins
*Attorney, Agent, or Firm*—James M. Cate

[57] ABSTRACT

A method and apparatus for modulating a light beam in an optical processing system is described. Preferably, an electrically-controlled polarizer unit and/or an analyzer unit are utilized in combination with a spatial light modulator and a controller. Preferably, the spatial light modulator comprises a pixelated birefringent medium such as a liquid crystal video display. The combination of the electrically controlled polarizer unit and analyzer unit make it simple and fast to reconfigure the modulation described by the Jones matrix of the spatial light modulator. A particular optical processing objective is provided to the controller. The controller performs calculations and supplies control signals to the polarizer unit, the analyzer unit, and the spatial light modulator in order to obtain the optical processing objective.

40 Claims, 14 Drawing Sheets

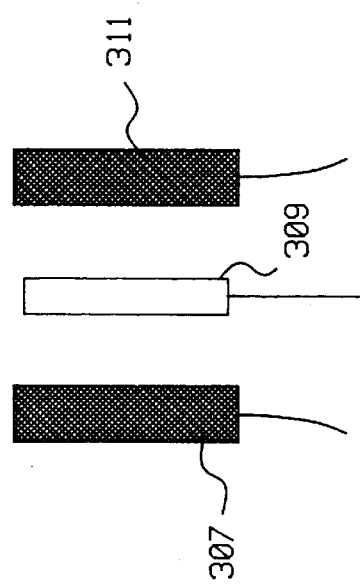
FIG. 7C
FIG. 7B
FIG. 7A

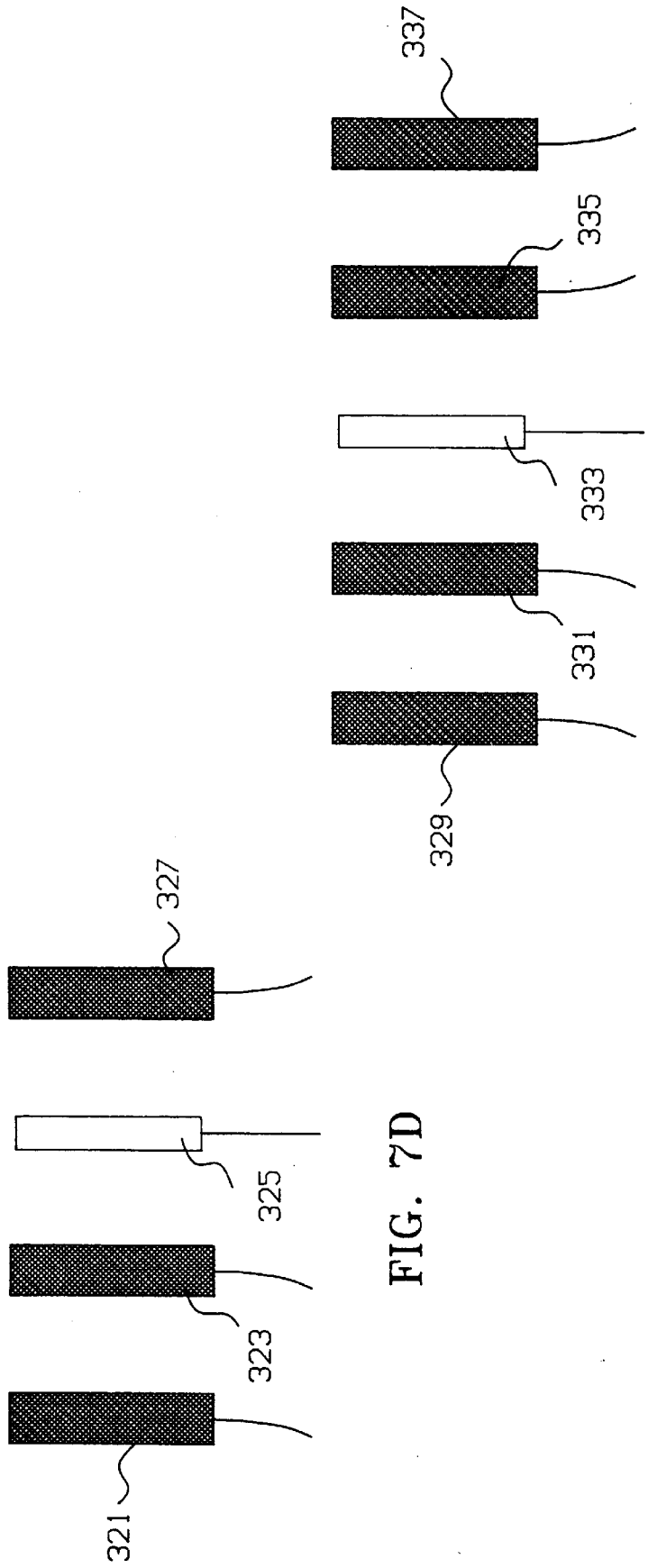

METHOD AND APPARATUS FOR IMPROVED SPATIAL LIGHT MODULATION

ORIGIN OF THE INVENTION

The invention described herein may be manufactured and used by or for the Government of the United States of America for governmental purposes without the payment of any royalties thereon or therefor.

BACKGROUND OF THE INVENTION

1. Field of the Invention

The present invention relates in general to optical processing systems, and in particular to an improved method and apparatus for modulating a light beam in an optical processing system.

2. Description of the Prior Art

Many optical processing systems utilize spatial light modulators to encode and/or filter information onto or from a light beam, typically a coherent laser beam. These spatial light modulators operate by modulating a light beam in two dimensions by changing the intensity and/or phase of the light wave in a controllable manner. Thus, they can be used to introduce spatial patterns onto a light beam. The commercially available spatial light modulators however tend to be expensive. As a consequence, many optical processing systems utilize liquid crystal video displays as an inexpensive and readily available alternative to spatial light modulators. They may be obtained from commercially-available color video projector units, such as the Crystal Image Video Projector unit Model No. E1020, manufactured by Epson. Such projector units have a reasonable optical quality insofar as they are spatially uniform. Furthermore, each liquid crystal display is individually electrically addressable. The displays are typically driven utilizing a specialized electronic drive circuit which is supplied with the projector unit. The drive circuit acts as an interface between an analog video signal and the two dimensional matrix of pixels which make up the liquid crystal video display at that particular pixel. The voltage across each pixel of the liquid crystal video display is proportional to the gray scale level at the corresponding location in the video display. Typically, the liquid crystal video displays are twisted-nematic liquid crystal devices, which means that the optical birefringent axes, caused by the anisotropy of the liquid crystal molecules, rotate throughout the thickness of the cell, in a manner similar to that depicted in FIG. 1A. The birefringence is altered or modulated by the application of the drive voltage (which is derived from the video signal) across a pixel. This change in the birefringence causes a change in the polarization state of any light beams which pass through the liquid crystal video display. If the liquid crystal video display is disposed between two polarizing optical instruments, the polarization modulation is converted to amplitude or phase modulation of the light beam. It is the amplitude and/or phase modulation of a light beam which allows for the processing of images. More specifically, the amplitude and/or phase modulation can be utilized for either encoding information onto the light beam, or for filtering or otherwise manipulating information on the light beam. Since the interaction between the light beam and the liquid crystal video display is fairly complicated, a simple amplitude-only modulation or phase-only modulation is not possible.

The liquid crystal video displays are merely one type of "complex spatial light modulator" which are utilized in optical processing systems. A complex spatial light modulator can be characterized as an optical processing device whose action on a light beam may be expressed as affecting the phase and amplitude (or alternately, the real and imaginary parts) of an incident light beam. Typically, spatial light modulators, such as the liquid crystal video display, are useful for optical processing of images as a function of position over the active area of the optical processing device. While liquid crystal displays may be electrically addressed on a pixel-by-pixel basis, other types of complex spatial light modulators are addressable as a continuous function of position. For purposes of the present application, the terms "complex spatial light modulator" and "spatial light modulator" will define all optical devices which affect the phase and amplitude of an incident light beam; however, the preferred embodiment discussed herein will specifically refer to a liquid crystal video display, which is merely one type of complex spatial light modulator.

The prior art devices used for generating and analyzing specific polarization states include one device developed by J. L. Pezzaniti and R. A. Chipman which permits the automated measurement of the Meuller matrix of a spatial light modulator. This device is described in detail in the following publications:

J. L. Pezzaniti and R. A. Chipman, "Phase-only Modulation Of A Twisted Nematic Liquid-Crystal TV By Use Of The Eigenpolarization States", Optics Letters vol. 18, pp. 1567–1569 (September 1993); and J. L. Pezzaniti, R. A. Chipman, and D. A. Gregory, "Polarization Characterization Of A LCTV With A Meuller Matrix Imaging Polarimeter", in Optical Pattern Recognition IV, D. Casasent, ed., Proc. SPIE vol. 1959, pp. 266–281 (1993).

J. L. Pezzaniti, Meuller Matrix Imaging Polarimetry, PhD Thesis, University of Alabama in Huntsville (1993).

A major distinction of the present invention from the Pezzaniti and Chipman device is that the Pezzaniti and Chipman device requires gross physical motion (rotation) of polarizers and retarders in order to generate and analyze its set of polarization states. In contrast, the only physical motion in the present invention is the rearrangement of liquid crystal molecules. Another distinction is that the art of Pezzaniti has its preferred embodiment as a laboratory bench tool to characterize the polarization properties of spatial light modulators, as opposed to the present invention's major operational intent of providing immediate access to any of a plurality of different polarization behaviors. Accordingly, it is slower, more accurate, more stable, bulkier, heavier, more complicated, and more precise that the present invention.

SUMMARY OF THE INVENTION

It is one objective of the present invention to utilize the rather large number of different operating characteristics which are possible with complex spatial light modulators in order to achieve particular optical processing objectives.

Still more particularly, it is another objective of the present invention to utilize a complex spatial light modulator in combination with at least one of (1) a polarizer unit, and (2) an analyzer unit, which has an optical effect on the light beam, which either is incident to the complex spatial light modulator or emergent from the complex spatial light modulator, in a manner which is determined by one or more electrical control signals provided by a controller.

It is a still more particular objective of the present invention to utilize the controller in order to respond to a provided optical processing objective by examining a predetermined number of optical transform options available through the control parameters which may be provided to one or more of the complex spatial light modulator, a polarizer unit, and an analyzer unit.

These and other objectives are achieved as is now described. The present invention may be characterized as either a method or apparatus for processing a light beam. At least one of a polarizer unit and an analyzer unit are provided. The polarizer unit polarizes an incident light beam in a selected one of a plurality of available polarization states in response to receipt of at least a selected one of a plurality of available electrical command signals. The analyzer unit selects from an incident light beam one of a plurality of available polarization states in response to receipt of at least a selected one of a plurality of available electrical command signals. A spatial light modulator is provided for receiving an incident light beam and modulating the incident light beam by converting one polarization state into another in accordance with an optical polarization transform associated with an operating range of at least one drive parameter for the spatial light modulator. Additionally, a controller member is provided for supplying control signals to at least one of the polarizer unit and the analyzer unit. The controller member also supplies at least one drive parameter value to the spatial light modulator. A light beam is passed through the spatial light modulator and at least one of the polarizer unit and the analyzer unit. A particular optical processing objective is provided to the controller member, and the controller member is utilized to supply the control signals to at least one of the polarizer unit and the analyzer unit, and to supply at least one drive parameter value to the spatial light modulator, in a manner which obtains or achieves the optical processing objective.

Additional objectives, features and advantages will be apparent in the written description which follows.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 7A–7E depict different embodiments which may be used in the optical correlator system of FIGS. 4A and 4B.

DETAILED DESCRIPTION OF THE INVENTION

Figure 1A:
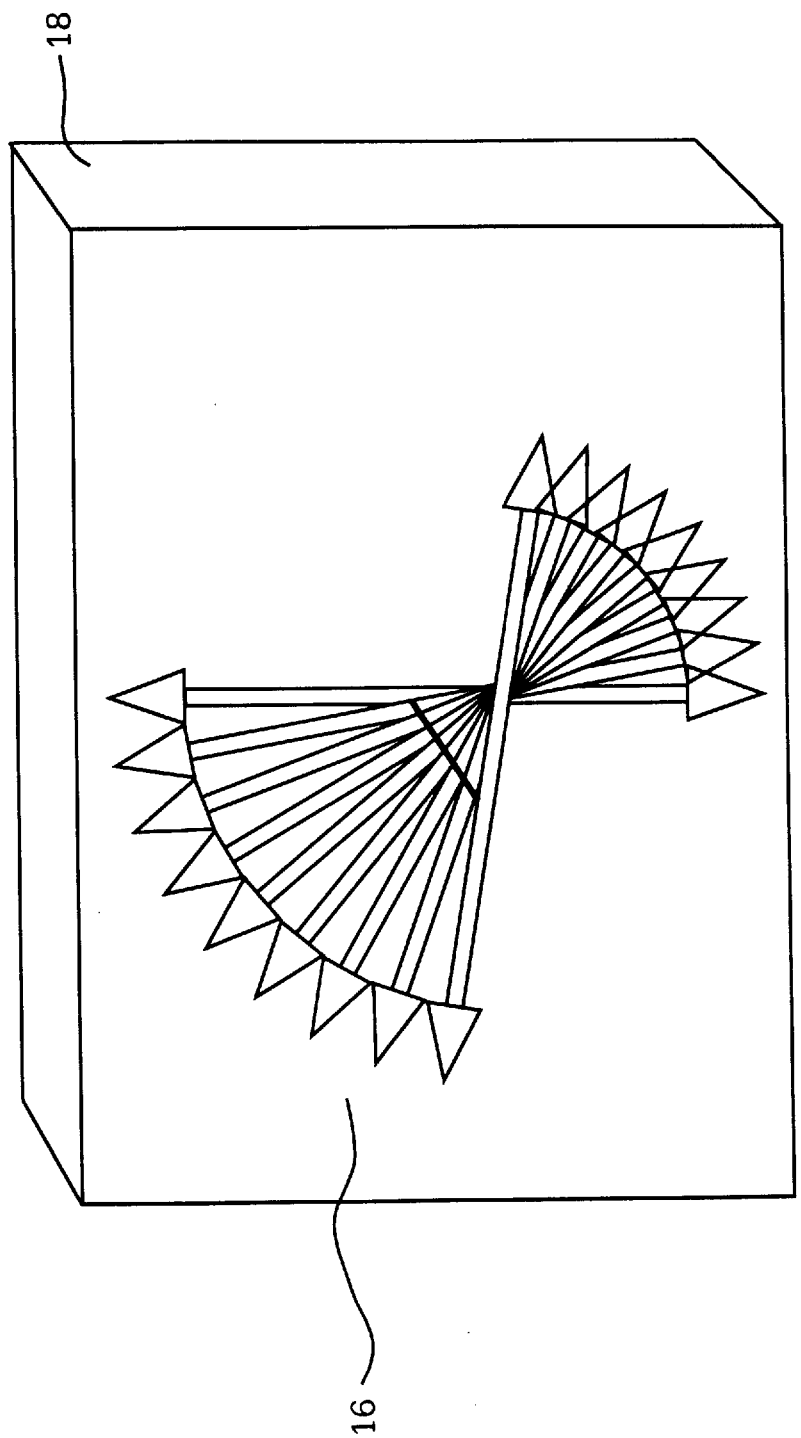
FIG. 1A depicts the changing direction of the extraordinary birefringent axis of light through the thickness of an LCD screen.

Before discussing the particular details of the present invention, a brief overview of optical processing components and the related Jones calculus will be provided. Linear polarizers are devices which transmit a component of an incident electromagnetic electric field in the direction of its "transmission axis", and which block the component of the electromagnetic electrical field which is orthogonal to its "transmission axis". This preferential passing of components of an electric field can be achieved by selective absorption, selective reflection from an isotropic medium, or selective reflection/refraction at the boundary of an anisotropic medium. "Wave retarders" are characterized by a retardation amount, and the orientation of a "fast axis" and a "slow axis". Upon transmission through a retarder, a relative phase shift between the orthogonal components of the electric field in the light beam occurs. "Polarization rotators" are utilized to rotate the plane of rotation of linearly polarized light by a fixed angle, while maintaining its linearly polarized nature. Optical "analyzers" are utilized to selectively transmit light which is polarized in only one orientation, thus acting as a valve or filter. A "spatial light modulator" is a device that modulates light at different positions by predefined factors. Typically, it is a planar optical element of controllable intensity transmittance and/or relative phase shift. The emergent light at each location can be characterized by the product of the Jones matrix describing the optical properties of the spatial light modulator times the Jones vector describing the polarization state of the light input to the modulator. When a pixelated liquid crystal video display is utilized as a spatial light modulator, each pixel of the liquid crystal video display may be described in terms of an optical transform, typically in terms of the Jones matrix for the pixel. Commercially available liquid crystal video displays typically utilize twisted-nematic liquid crystal cells placed between two parallel glass plates and rubbed so that the molecular orientation rotates about a helix normal to the plates, which is defined as the "axis of twist". When an electric field (which is created by one or more drive voltages applied to the pixel) is applied in the direction of the axis of twist, the molecules tilt toward the field. When the molecules are tilted at ninety degrees, the polarizing effect of the liquid crystal cells is eliminated. If the electric field is removed, the orientation of the crystal layers near the glass dominate, thereby causing the molecules to return to their original upright state, causing the polarization effect to be regained. FIG. 1A graphically depicts changing direction of the extraordinary birefringent axis 16 of light through the thickness of a liquid crystal video display 18.

An optical processing component may be characterized mathematically in the terms of a Jones matrix. Jones matrices describe the effects of mathematically linear optical polarizing elements. Table 1 which is appended hereto provides Jones matrices for a variety of rather simple and conventional optical devices, including linear polarizers, quarter-wave retarders, half-wave retarders, isotropic retarders, relative phase changers, and circular polarizers. In the table, where applicable, a plurality of different "orientations" are defined for each type of optical device. The table also includes a Jones matrix which defines the effect of the optical device at the particular defined orientation. When light is propagated through mathematically linear optical polarizing elements, the light wave's polarization state is sequentially multiplied by the optical elements' Jones matrices. This can best be described with reference to FIG. 1B. The polarization state of light beam 15 is defined by polarization states $S_1$, $S_2$, $S_3$, and $S_4$, wherein $S_1$ represents the polarization state of light which is incident to optical processing device 17 which has a Jones matrix of $J_a$. The light which emerges from optical processing device 17 has a polarization state of $S_2$ which is the vector product of the polarization state $S_1$ and the Jones matrix $J_a$. The polarization state of the light incident to optical processing device 19 is $S_2$. The optical effect of optical processing device 19 is represented by Jones matrix $J_b$. The light emergent from optical processing device 19 has a polarization state of $S_3$ which is the vector product of the polarization state $S_2$ and the Jones matrix $J_b$. The polarization state of light incident to optical processing device 21 is $S_3$. The Jones matrix associated with optical processing device 21 is represented by Jones matrix $J_c$. The polarization state of the light emerging from optical processing device 21 is $S_4$ which is the vector product of the polarization state of the incident light $S_3$ and the Jones matrix $J_c$. Since these optical processing devices 17, 19, 21 are mathematically linear, the composite optical effect of optical devices 17, 19, 21 is the matrix product of Jones matrices $J_c$, $J_b$, and $J_a$, vector multiplied with the polarization state of the incident light $S_1$. Therefore: the emergent light S4 equals $J_c \cdot J_b \cdot J_a \cdot S_1$.

In the context of the preferred embodiment of the present invention, optical processing device 17 comprises a compound polarizer, optical processing device 19 comprises a pixelated spatial light modulator, and optical processing device 21 comprises a compound analyzer. The compound polarizer and compound analyzer may be defined by rather simple Jones matrices such as those set forth in Table 1 (and the Jones vectors for some types of polarization on which the matrix operates can be described as set forth in Table 2); however, the operation of a pixelated spatial light modulator, such a optical processing device 19, is rather more complicated, with each pixel of the spatial light modulator defining a different optical transform which affects the polarization state of the light incident to the spatial light modulator in a manner which is dependent upon one or more control voltages which are applied to the spatial light modulator to effect a pixel-by-pixel spatial modulation of light beam 15. Also, typically with analog polarization spatial light modulator devices, the Jones matrix for each pixel represents a range of the available optical transforms, dependent upon the drive voltage or voltages which are available.

In the preferred embodiment of the present invention, the compound polarizer preferably comprises a linear polarizer, a polarization rotator, and a retarder, as will be discussed in further detail herebelow. Additionally, in the preferred embodiment of the present invention, the compound analyzer comprises a retarder, a polarization rotator, and a linear polarizer. In various alternative embodiments of the present invention, certain elements of the compound polarizer and compound analyzer may be omitted. Additionally, in still other embodiments, either the compound polarizer or compound analyzer may be omitted in its entirety. Also, preferably, in the present invention, the compound polarizer and compound analyzer are uniform over their active areas, which stands in contrast with the preferred spatial light modulator which is preferably a pixelated spatial light modulator with independent action at each pixel. However, in alternative embodiments, non-pixelated spatial light modulators may be utilized.

In the preferred embodiment of the present invention, the combined controller-implemented selection of Jones matrices optical transforms for the pixels of the spatial light modulator, the polarization effect of the compound polarizer, and the selection effect of the compound analyzer are utilized to obtain a particular one of a plurality of available transform operating curves, in order to obtain some optical processing objective.

In the preferred embodiment of the present invention, the improved spatial light modulator comprises in sequence a compound polarizer, the spatial light modulator itself, and a compound analyzer. It uses the pixellation of the Jones matrix spatial light modulator to provide spatial variation in the optical processing. The combination of the compound polarizer and the compound analyzer may be used to obtain a desired member of a family of operating curves in order to achieve a particular data processing objective.

Ordinarily a spatial light modulator may modulate light by varying its Jones matrix $J_b$ at each pixel. Ordinarily, the Jones matrix will be controlled by a single control parameter, such as voltage across the liquid crystal cell, so the set of input polarization states $S_2$ in Cartesian product with the resultant output polarization states $S_3$ is accordingly limited. The purpose of the present invention is to allow a wide latitude in selecting from the family of possible input/output combinations, and also to make such selection easily, efficiently, and rapidly accomplished.

Figure 1B:
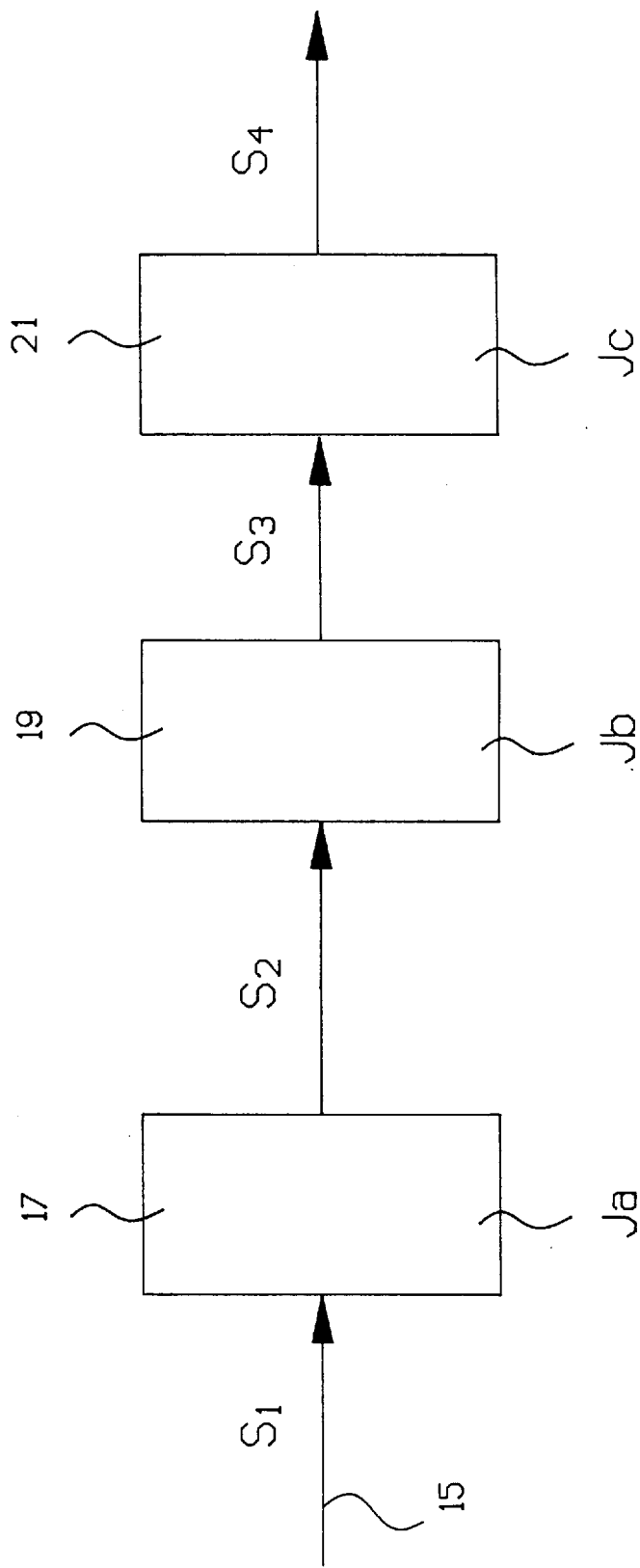
FIG. 1B is a block diagram of light propagating through linear optical elements including their Jones matrices.

Again, with reference to FIG. 1B, the polarization state $S_2$ is determined by the first compound element. Not just any input state $S_1$ will pass through the first compound element without losing energy to the compound element. The matrix $J_a$ describes the selection of part of the state $S_1$ that passes through the compound polarizer and appears as $S_2$. Similarly, the component state of $S_3$ that will pass the second compound element without being blocked, thus appearing as $S_4$, is determined by the compound analyzer, which is described by matrix $J_c$. The action of $J_b$ of the Jones matrix modulator is to connect the polarization states $S_2$ and $S_3$, with further aspects of the $S_1$ to $S_4$ modulation being determined by $J_a$ and $J_c$. Thus, if we can easily change $J_a$ and $J_c$, we can easily change the overall effective Jones matrix J. Typically, with analog spatial light modulators of the Jones-matrix type, there is a family of curves available. More particularly, the Jones matrix at each pixel is a function of one or more drive voltages applied to that pixel.

If we consider the case where $S_1$ and $S_4$ are similar polarization states, as determined by the values of the component elements of the compound polarizer and the compound analyzer, then the action of J may clearly be seen to be expressed as a complex scalar, so its behavior is immediately plotted in the complex plane. If $S_1$ and $S_4$ are different polarization states, even though J is a complex matrix, its voltage-controlled action will change the phase and amplitude of the light in the analyzed state $S_4$, and thus the combination of compound analyzer, spatial light modulator and compound polarizer may be regarded as affecting both the amplitude and phase of $S_4$ so again the assembly may be regarded as a complex spatial light modulator.

In optical information processing, it is important to have spatially localized control of the light. For example, in optical correlator pattern recognition operations, a spatial light modulator is used to encode the signal pattern into the light beam at the input location, and similarly a spatial varying effect is implemented at the filter location. Spatially distributed control of the pixelated modulator is one key to having a spatial light modulator. Since $J_b$ may have differing values at different locations on the modulator, so also may J vary across its face. A significant point of the present invention is that the compound spatial light modulator may be used in any location where light is to be modulated as a function of spatial position. In a serial correlator architecture, sometimes known (slightly erroneously) as a VanderLugt architecture, one might place a compound spatial light modulator in accordance with the present invention in both the input plane and the filter plane, or in either one.

Figure 2B:
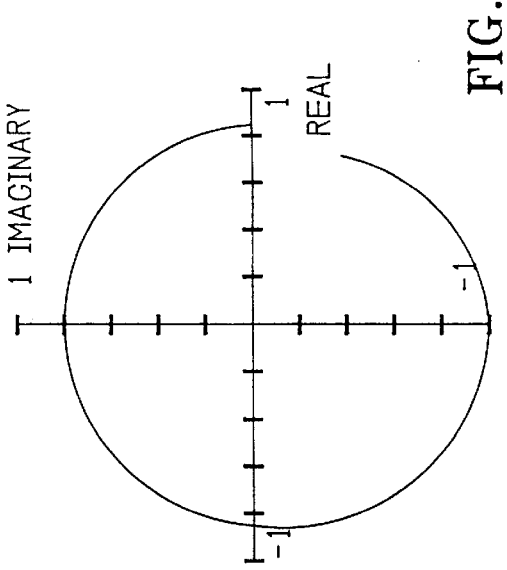
FIGS. 2A–2C each is a graph of selectable operating curves according to the present invention.
Figure 2D:
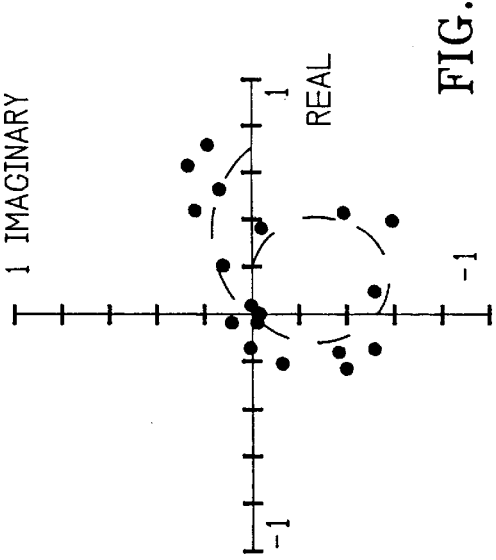
FIG. 2D is a graph of hypothetical ideal complex filter values according to the present invention, in which it is seen that the ideal values (dots) conform more closely to the curve of FIG. 2A than to either of the others.
Figure 2A:
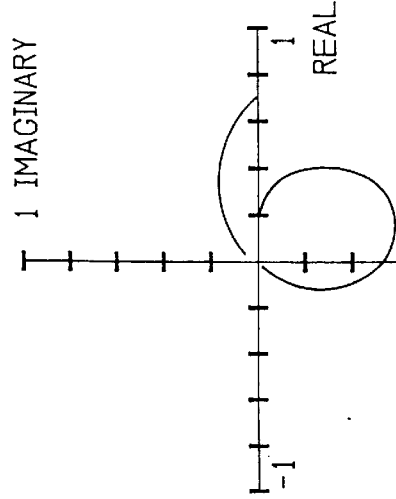

As was stated above, the mode of operation of a twisted-nematic liquid crystal video display produces many interesting characteristics, which modulate both intensity and phase. Graphically, the optical effect of a particular pixel in a liquid crystal video display can be represented as a curve traced out in the complex plane. This is so because the modulation is complex, modulating both amplitude and phase together, but is restrained to a single path in the complex plane. We may call this path the "operating curve" of the device. These operating curves are determined by measuring the amplitude and phase modulation as a function of a particular drive parameter: the parameter that is varied to change the voltage across each pixel. In the preferred liquid crystal video displays utilized in the present invention, this voltage is representative of a gray scale value for the pixel which extend from a gray scale value of 0 to a gray scale value of 255. The plot produced is of the function:

$$(T)^{1/2} * \sin(\delta) \text{ versus } (T)^{1/2} \cos(\delta);$$

where T represents the intensity transmission, and delta represents the phase-shift produced at each gray scale level. An example of such a plot is shown in FIG. 2A. To produce the appropriate amount of complex modulation, the relevant gray scale level is configured in a digitizer board and the liquid crystal video display produces one of the points on the curve, which we may consider to be points which are "realizable". It is important to note that only points on the operating curve can be represented exactly in this operating mode of the liquid crystal video display. Any of the complex values of modulation can be approximated using only those values which are "realizable".

Figure 2C:
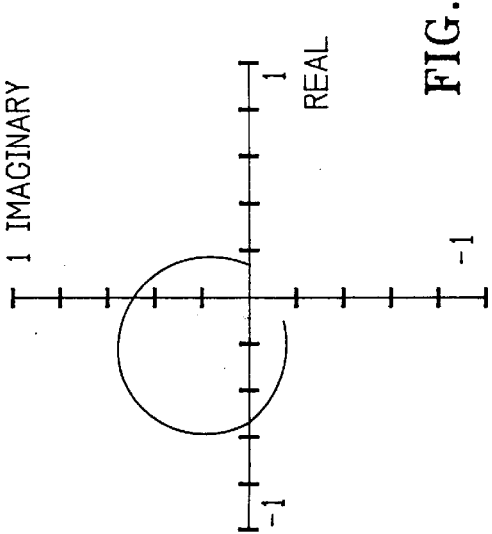
Figure 3:
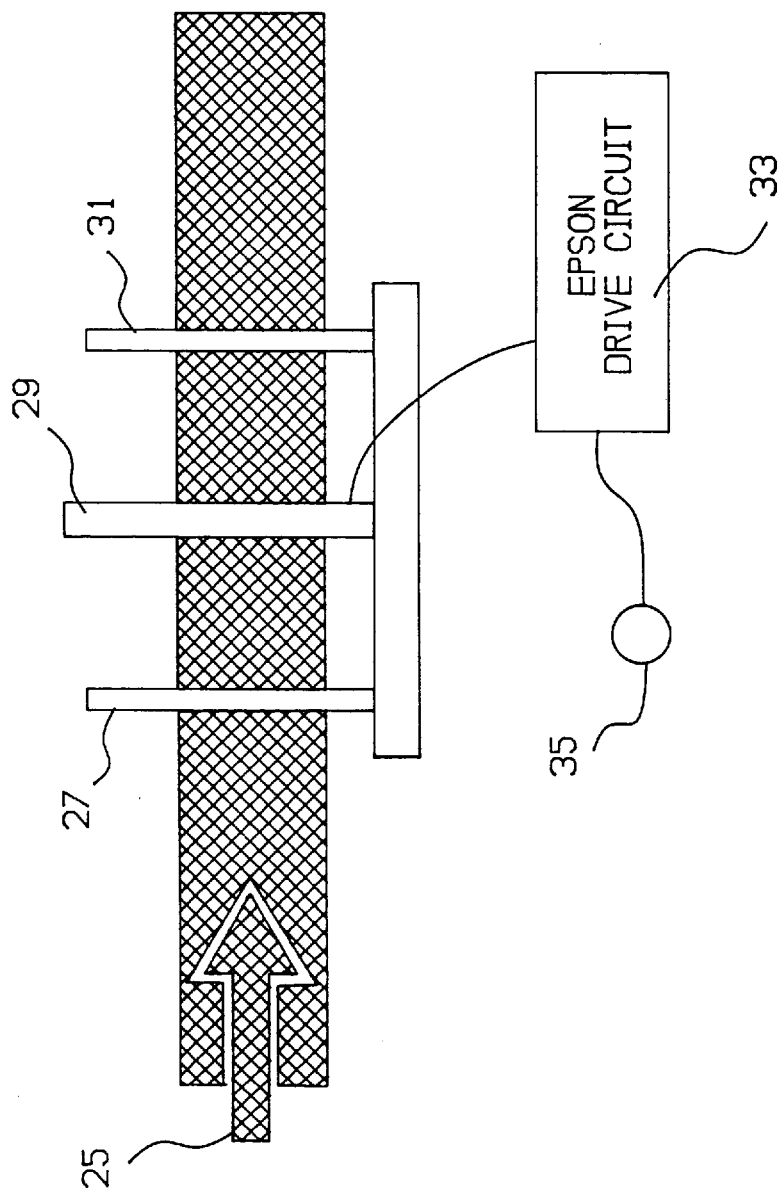
FIG. 3 depicts a block diagram of a spatial light modulator according to the present invention.

FIG. 3 is a representation of the preferred embodiment of the present invention, with laser beam 25 providing a coherent light which is passed first through polarizer unit 27, the liquid crystal television 29, and finally through analyzer 31. A video signal 35 is provided to a drive circuit 33 for liquid crystal television 29 in order to provide a spatial pattern which is modulated on laser beam 25. Polarizer unit 27 determines the state of the linear polarization of the light that is incident to liquid crystal television 29. This polarization is then modified to a certain degree by the voltage-sensitive birefringence caused by changing the voltage across the pixels of the liquid crystal television 29. Then, the analyzer unit 31 selects a component polarization state of the emergent beam. Thus, the properties of modulation are dependent upon both the settings of the polarizer unit 27 and the analyzer unit 31, relative to liquid crystal television 29. Of course, it is also dependent on the voltage bias that is usually added to the video signal. The setting of the polarizer unit 27 is particularly critical in determining the operating curve of liquid crystal television 29. The term "spatial light modulator" is now being used to refer to the complete unit which comprises the polarizer unit 27, the liquid crystal television 29, and the analyzer unit 31. FIGS. 2A through 2C show some examples of operating curves of a spatial light modulator. It is worth noting that these three curves were all obtained with the same orientation of analyzer unit 31; all that was changed between the three curves (other than the bias added to the video voltage) was the setting of polarizer unit 27.

Figure 4A:
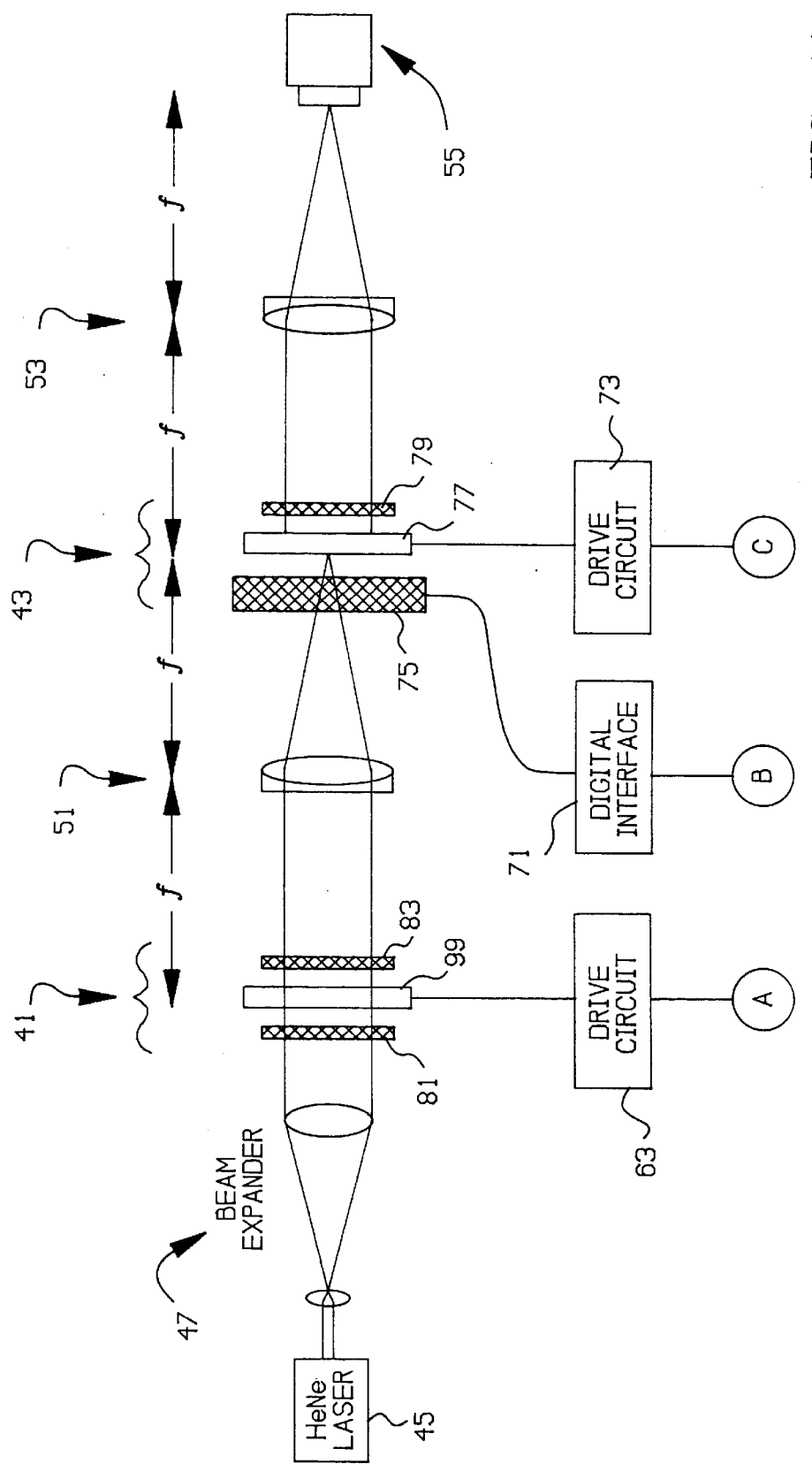
FIGS. 4A and 4B depict a block diagram of an optical correlator system according to the present invention.
Figure 4B:
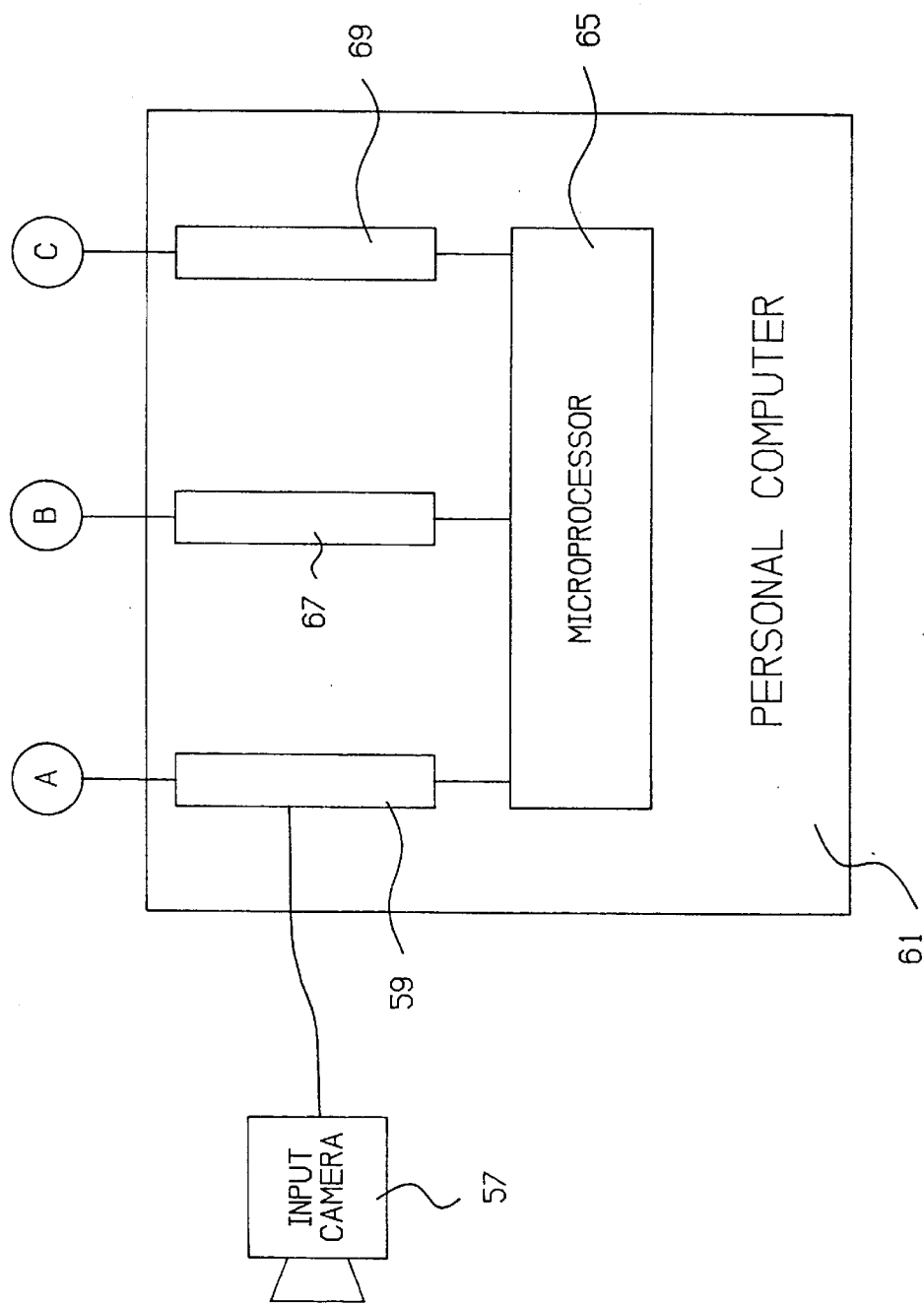

One particular application of the present invention is in an optical correlator system, such as that depicted in FIGS. 4A and 4B. In this system, two spatial light modulators are utilized: one as an input-modulator 41, and the other as a filter-modulator 43. In prior art systems, spatial light modulators are utilized in optical correlators. Typically, they are configured to operate in a particular manner by fixing the polarizer unit and analyzer unit to specific orientations, which cause the resulting action to approximate amplitude-only modulation or phase-only modulation, for example. In the prior art, any change between the different operating modes of a modulator would have to be made by mechanically rotating either the polarizer unit or the analyzer unit or both. This mechanical adjustment requires a certain degree of skill, physical access to the equipment, and assurance of repeatability. The calibration problems associated with manual adjustments can be formidable. In the present invention, in lieu of manually-adjusted polarizer units and analyzer units, an electrically-addressable device is utilized to alter the polarization, so the overall operating characteristics of the filter modulator 43 may be changed without requiring manual or mechanical interaction with the equipment. In the preferred embodiment of the present invention, an electrically-controlled polarization rotator is utilized, such as the Model No. SPR0.7.633 polarization rotator which is manufactured by Meadowlark Optics of Longmont, Colo. Also in the preferred embodiment of the present invention, a liquid crystal variable retarder is utilized, such as the model number LVR0.7.633 liquid crystal variable retarder manufactured and sold by Meadowlark Optics of Longmont, Colo., which provides a predefined amount of differential retardance in response to a control voltage.

With reference now to FIGS. 4A and 4B, Helium-Neon laser 45 is used as a source of coherent light. The laser beam diameter is expanded using a two lens system which define beam expander 47. This produces a beam which is large enough to illuminate input modulator 41. The beam expansion also ensures that the intensity and phase do not vary greatly across the central portion of the beam that is used. The expanded laser beam then passes through input modulator 41, and "picks-up" the information displayed on liquid crystal television 49 of input modulator 41, owing to the amplitude and/or phase modulation. This image information on the laser beam is subject to the process of diffraction, and is accordingly decomposed into its spatial frequency components. The complete decomposition of the image into the spatial frequency components occurs at the far-field diffraction pattern (infinity); however, Fourier transform lens 51 is used to bring this far-field pattern into a more reasonable distance, such as the back focal plane of the lens which is defined as the plane which is located a distance of one focal length behind the lens. The input data are placed at the front focal plane (one focal length) away from Fourier transform lens 51. The result is that an optical Fourier transform is formed at the plane of filter modulator 43. The Fourier transform is important to the operation of a correlation system because of its well known properties in signal processing. Among these properties is its "shift-invariance" which allows the system to be used for shift-invariant pattern recognition or object tracking.

The image that is displayed on the filter modulator 43 is a previously calculated version of the complex-conjugate of the Fourier transform of the object being tracked. If the input scene, which is derived from live video, is identical to the object of interest then the phase-structure of a laser beam will be to a greater or lesser degree "canceled-out" at the filter modulator 43, and a flat wavefront will emerge. This beam is again Fourier transformed by Fourier transform lens 53 to produce a bright spot, which is identified as the "correlation peak", at the correlation plane. This bright spot of light is formed at the center of the object of interest, and will move if the object moves. In other words, the bright spot of light formed one focal length from Fourier transform lens 53 will provide a tracking indicator. Typically, a charged coupled device, such as CCD camera 55 is located at the correlation plane to record the position of the bright spot to allow replay and storage of the tracking operations.

As is shown in one embodiment in FIGS. 4A and 4B, the input image is captured by input camera 57 which provides an analog signal to personal computer 61 which includes microprocessor 65. Microprocessor 65 controls the operation of video digitizer 59 which digitizes the analog input from input camera 57, and provides it through drive circuit 63 to the spatial light modulator (preferably a liquid crystal video display) of input modulator 41.

As was stated above, the filter modulator 43 is utilized to apply the complex-conjugate of the Fourier transform of the object being tracked to the light beam. This is accomplished by utilizing microprocessor 65, video digitizer 69 and drive circuit 73 to provide for spatial light modulation by liquid crystal spatial light modulator 77. Additionally, an electrically-actuable polarization rotation device 75 is provided and controlled by the microprocessor through digital input/output card 67 and digital interface 71 (which is preferably an interface which is provided with the polarization rotation device). Electrical control signals are provided by personal computer 61 through digital interface 71 to polarization rotation device 75 to influence the cumulative optical transform of filter modulator 43 in a manner which optimizes a provided optical processing objective which is provided to or derived by personal computer 61, as will be discussed further herebelow.

In the embodiment of FIGS. 4A and 4B, input modulator is shown as including polarizer 81 and analyzer 83 which substantially uniformly polarize and filter the light beam. Additionally, filter modulator 43 is depicted as including analyzer 79.

Figure 5B:
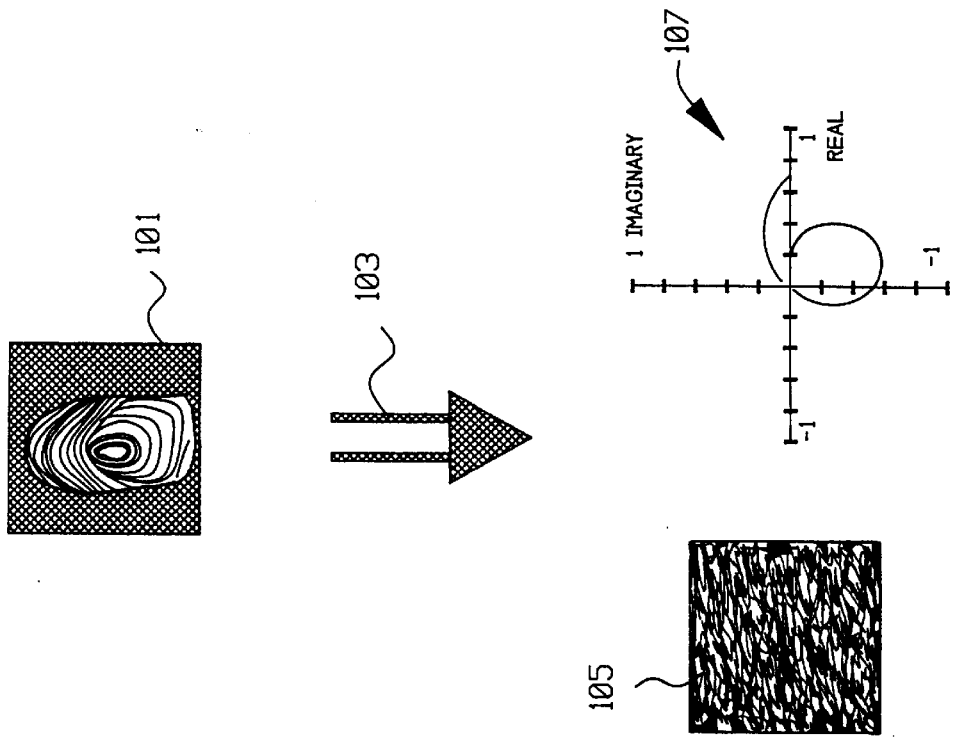
FIG. 5B further depicts the operation of the optical correlator according to FIGS. 4A and 4B used in fingerprint identification.
Figure 5A:
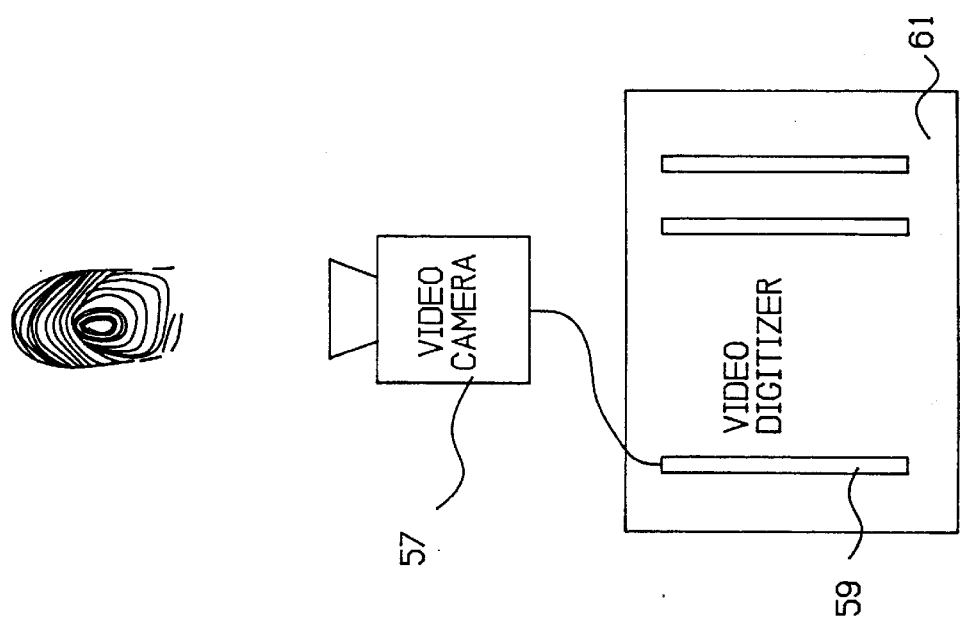
FIG. 5A depicts the first stage of operation of the optical correlator as depicted in FIGS. 4A and 4B for use in fingerprint identification.

The operation of the optical correlator of FIGS. 4A and 4B will now be described with reference to FIGS. 5A, 5B, and 5C in the context of fingerprint identification. First, a digital version of the object of interest (the fingerprint) is acquired using the combination of video camera 57 and video digitizer board 59 which is resident in personal computer 61. This digital image is then read into a computer program which will be used to create the filter. The classical matched-filter is usually used as the starting point for filter generation. This filter is the complex conjugate of the Fourier transform of the object of interest. However, as mentioned previously, current available spatial light modulators cannot attain arbitrary complex values of modulation. Instead, they are constrained to the set of "realizable values" specified by the drive parameter, as is shown in FIGS. 2A through 2C. Thus, the best that can be done is to approximate the ideal filter by making the best use of what is "realizable" with filter modulator 43 of FIGS. 4A and 4B. There are many procedures used to implement this approximation, but the methods described in the following references are favored, which are incorporated herein by reference as if fully set forth:

Reference 1: Richard D. Juday, "Optimal Realizable Filters and The Minimum Euclidean Distance Principle", Applied Optics, Vol. 32, No. 26, pages 5001–5111, Sep. 10, 1993;

Reference 2: Richard D. Juday, R. Shane Barton, Jason Kinser, and Jennifer Lacroix Alvarez, "Efficient Code for Optimal Realizable Filter Calculation", Proc. SPIE, 262–268 (1993);

Reference 3: "MEDOF: Minimum Euclidean Distance Optical Filter", Computer code available under NT control number MSC-22380 from Cosmic (Computer Software Management Information Center), University of Georgia, 382 East Broad Street, Athens, Ga. 30602-4272.

This algorithm is utilized in Reference 3 which is the computer program called MEDOF which is available through COSMIC. This algorithm produces a filter which accounts for the actual modulation characteristics of the modulators used in the correlator. This is in contrast with previous techniques which assume ideal behavior of the modulator. The filter control produced by these techniques is sent to the filter modulator 43 of FIGS. 4A and 4B, and will produce a correlation spot if the object of interest is present in the live scene under examination. Therefore, as is depicted graphically in FIG. 5B, the digitally acquired image 101 is subjected to a filter generation software 103 to generate the set of filter drive signals 105 which, when applied to filter modulator 77 through drive circuitry 73, cause the correlator to "recognize" the reference object. The set of filter drive signals 105 will optimally depend on several factors, explicitly including the set of filter values 107 from which to choose and the pattern recognition metric being optimized.

In the present invention, the operating curve of filter modulator 43 (of FIGS. 4A and 4B) is not restricted to one specific configuration, such as encountered in the prior art when a pre-set operating curve is provided for the filter modulator. Instead, the range of available operating curves is expanded, by providing a means for changing the operating curves, which is under the control of personal computer 61 (of FIGS. 4A and 4B). This is accomplished in a preferred embodiment by substituting an electrically-addressable polarization modifying device in lieu of a conventional polarizer, as a component of filter modulator 43 (of FIGS. 4A and 4B). This is equivalent to changing the polarization state with a prior art device which can be adjusted simply by changing the voltage applied across polarization rotation device 75, rather than by mechanical manipulation of the polarization rotation device. As stated above, such devices are commercially available. One example is a Meadowlark Optics liquid crystal Sénarmont polarization rotator. Such a device can be controlled by a computer which supplies a digital word via a digital input/output card to a digital interface unit for the polarization rotator. In FIG. 5B we indicate that a specific digital word has resulted in the selection of operating curve 107. In the digital interface 71, the digital word is then converted to an analog voltage suitable for driving the polarization rotator 75 (of FIG. 5C), which will produce a certain rotation of the light polarization. This will change the linear polarization state which is incident on liquid crystal video display 77 in filter modulator 43. As is seen in FIGS. 2A through 2C, this dramatically affects the operating curve of filter modulator 43. Therefore, each of the operating curves shown in FIGS. 2A through 2C can have associated with it a digital word which, if supplied to the digital interface 71 for polarization rotator 75, will cause its associated operating curve to be present in filter modulator 43. Liquid crystal video display 77 is updated at video frame rates. Polarization rotator 75 can be changed during the "dead-time" of the liquid crystal video display addressing, such as during vertical retrace operations. Thus, a different operating curve could be used for each filter displayed on filter modulator 43. Once the system has been calibrated, each operating curve need be known only by its digital word identifier.

Figure 5C:
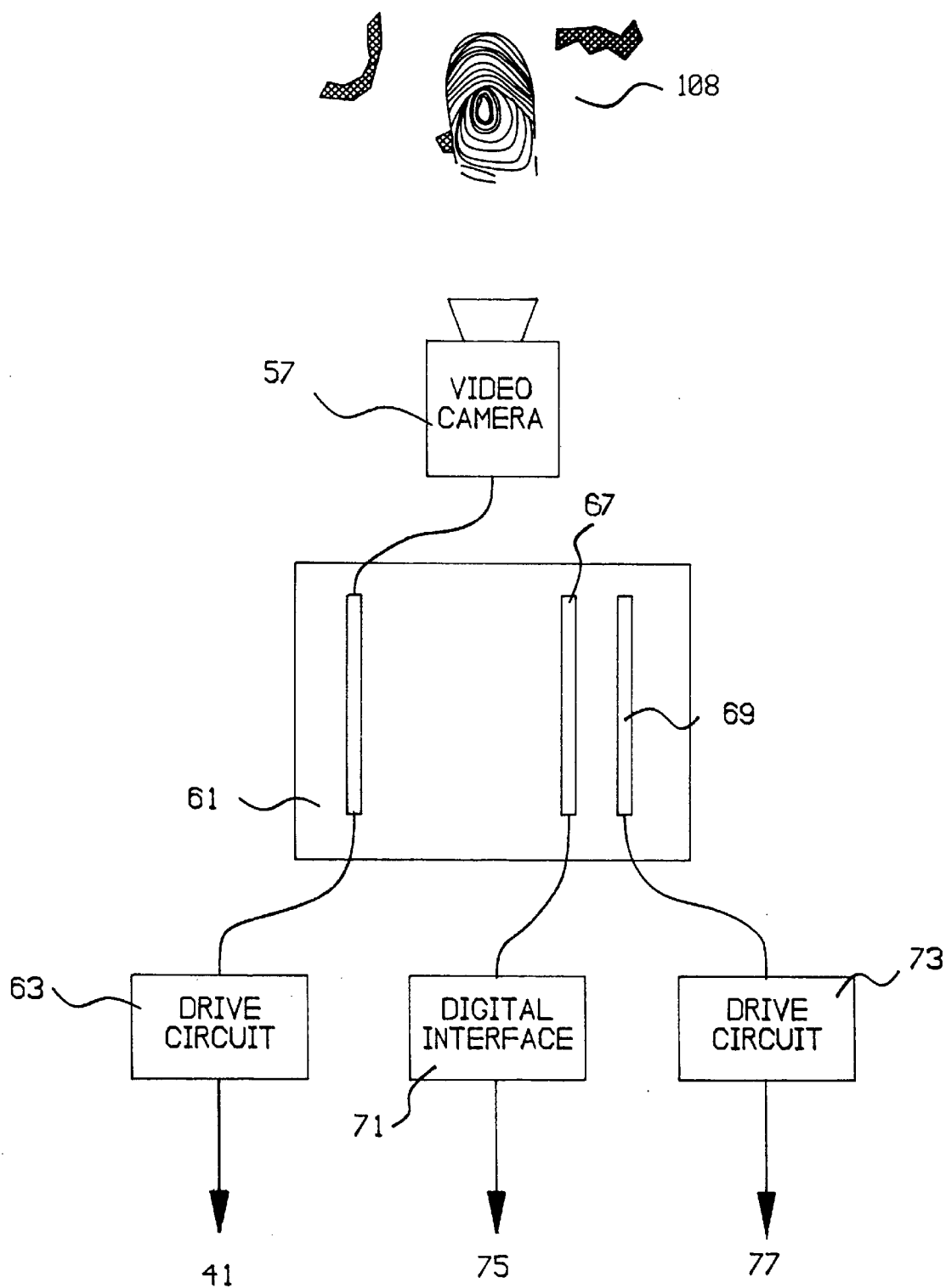
FIG. 5C depicts the final stage of operating optical correlator of FIGS. 4A and 4B as used in FIGS. 5A–5B.

So, in broad overview and with reference to FIG. 5C, input image 108 is captured by video camera 57 and routed to video digitizer 61 which provides through drive circuit 63 a video image which is impressed upon a light beam. Additionally, video digitizer 69 of personal computer 61 provides a signal to drive circuit 73 which is provided to a spatial light modulator (preferably a liquid crystal video display 77) of filter modulator 43. Additionally, digital input/output card 67 of personal computer 61 provides a digital word to digital interface 71 which converts the digital word into an analog signal which alters the polarization effect of polarization rotation device 75.

Figure 6A:
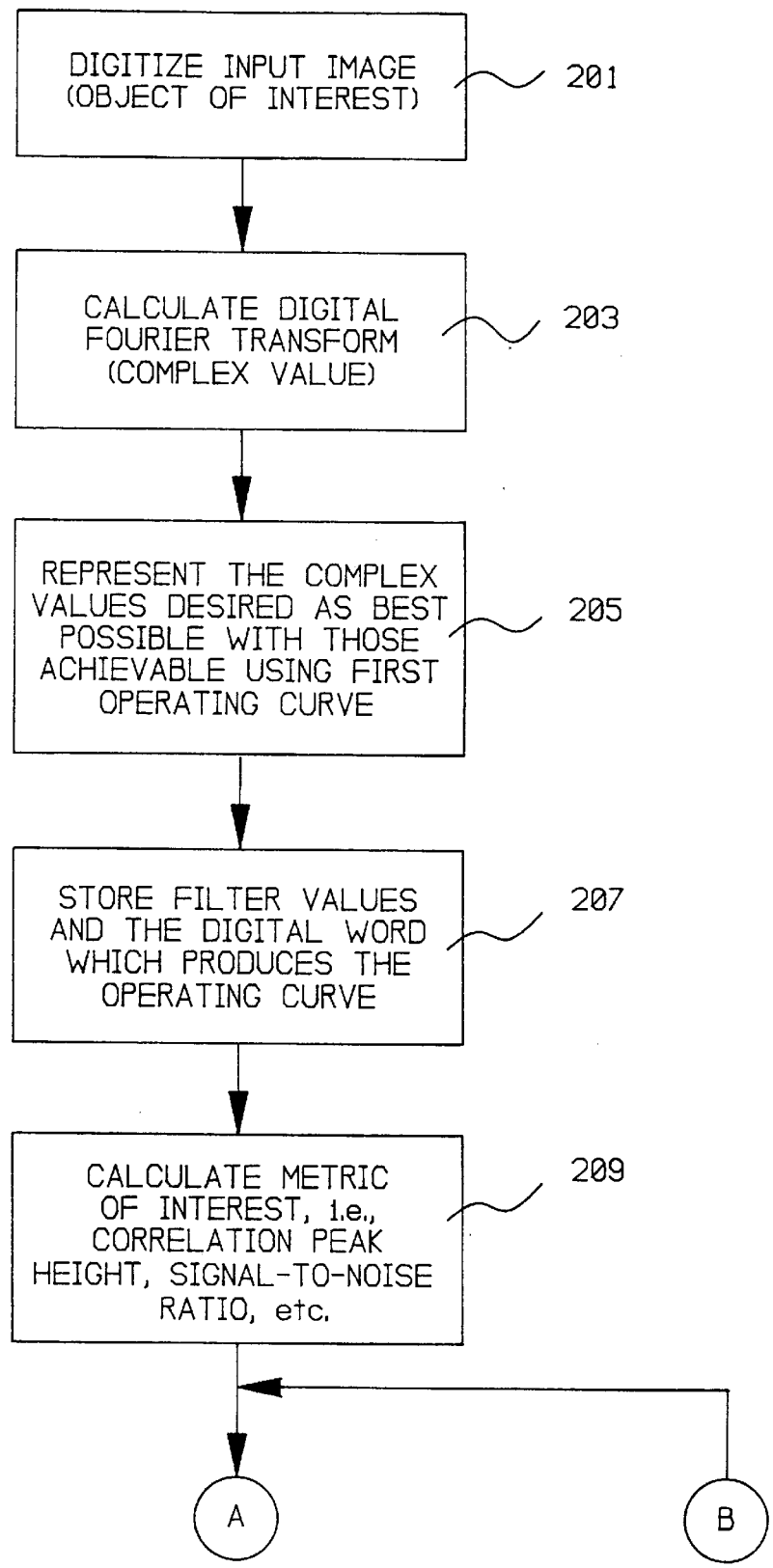
FIGS. 6A and 6B depict a flowchart for computing the optimal use of the spatial light modulation method according to the present invention.
Figure 6B:
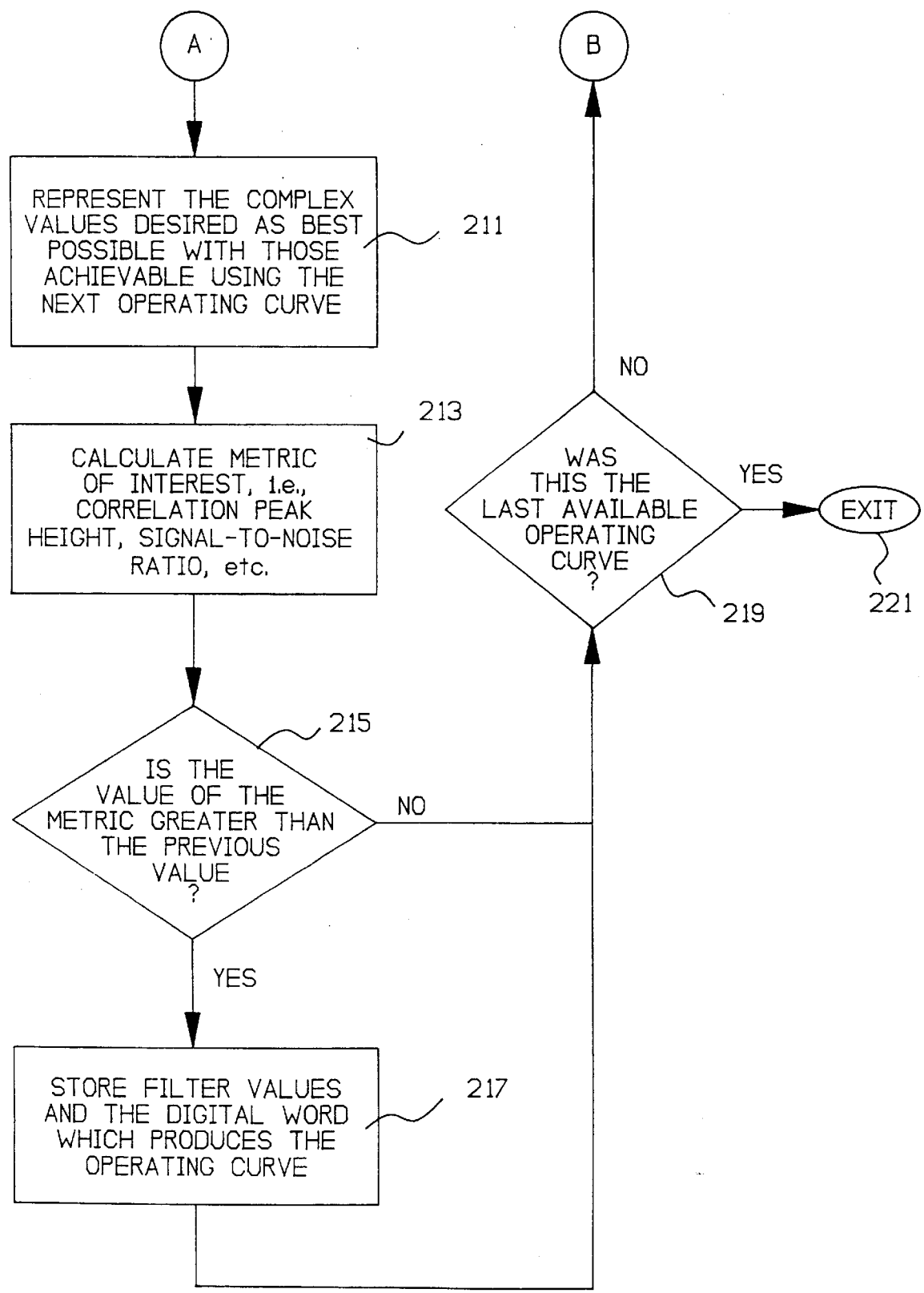

The reason for wanting to reconfigure the filter modulator 43 (of FIGS. 4A and 4B) to operate with different operating curves is that each curve can trace out only a restricted path in the complex plane. The filter is calculated so that the best approximation to the ideal filter is obtained. This involves comparing the ideal filter values (which desire arbitrary complex transmittances of the filter modulator 43) with the realizable values (which constitute the values traced out by the operating curve). Thus, for each operating curve a different solution may be obtained. Furthermore, it is anticipated that certain operating curves will produce a better approximation to the ideal filter than others. The hypothetical example of this effect is represented graphically in FIG. 2D. The black points in this complex plot represent ideal complex filter values. It is seen that of the three operating curves shown in FIGS. 2A through 2C, FIG. 2A would give a much better approximation to the ideal filter values than the other two operating curves. While this example is exaggerated to demonstrate the concept, there will be instances where an operating curve such as that shown in FIG. 2A would give a far superior performance in a correlator than the other two operating curves of FIGS. 2B and 2C. Specifically, this could be when some optical system noise is present in the live input scene. If this noise is spectrally characterized, then the regions in the filter at which this noise appears will be well defined. If the operating curve has on it some regions which produce very low transmittance (such as seen in FIG. 2A but not in FIGS. 2B and 2C), then the noise can be filtered out of the system. Thus, the curve shown in FIG. 2A would perform well in situations where input noise was to be suppressed, while still providing a useful correlation. The signal-to-noise ratio is a metric that is fairly well established in the optical processing community. Other metrics include the height of the correlation peak produced by the correlator. It is intended that the user of the filter generation algorithm would select a particular metric that he is interested in, and an example of the object of interest. The filter generation algorithm would then select the best operating curve from the set available, for that particular task (an optical processing objective), and would produce a filter suitable for implementation on it. A flowchart is shown in FIGS. 6A and 6B which describes the intended procedure. The data supplied to the correlator device would be the filter and the digital word.

Turning now to FIGS. 6A and 6B, the process begins at step 201 wherein the input image of the object scene, or pattern of interest is digitized. Then, in accordance with step 203 a discrete Fourier transform is calculated for the input image of the object of interest. Then, the complex values which are desired are represented as best possible with those values which are "achievable" or "realizable" using the first of a plurality of operating curves. Next, in accordance with step 207, the filter values are stored along with the digital word which produces the operating curve. Then in accordance with step 209 the metric of interest is calculated, such as the correlation peak height, or the signal-to-noise ratio. Next, in accordance with step 211 the complex values which are desired are represented as is best possible with the "achievable" or "realizable" values which are in the next operating curve. Then in accordance with step 213, the metric of interest is calculated, such as the correlation peak height, or the signal-to-noise ratio, or any other suitable metric. In step 215, the software determines whether the value of the metric for the present operating curve is greater than the previous value; if not, the process continues at software block 219; if so, the process continues at software block 217. In step 219, it is determined whether all of the available operating curves have been examined; if they have all been examined, the process continues at step 221 by exiting from this routine; however, if it is determined in step 219 that not all of operating curves have been examined, the process returns to step 211 where another operating curve is examined. If in step 213 it is determined that the value of the present metric is greater than the previous value, the process continues at step 217, wherein the filter values and associated digital word are stored in memory. In this manner, each of the available operating curves (from a finite set of operating curves such as six to ten curves) is successively examined to determine its suitability in terms of the metric selected by the operator. The operating curve which best achieves the metric goal established by the operator is recorded in memory along with the digital word which is used to realize this operating curve.

In order to understand References 1, 2, and 3 and their relationship to the flowchart of FIGS. 6A and 6B of the present invention, suppose one has the following fixed set: bias voltage $V_b$, drive voltage for the polarization rotation cell $V_p$, and angles of polarizer $\Psi_p$, and analyzer $\Psi_a$. Then the set of complex values traced as a pixel's video drive voltage varies through its range and is known as the operating curve.

Reference 1 describes a theory of how to use a given operating curve, and References 2 and 3 relate to a practical code that implements the theory of Reference 1. However, none of these References tell how to evaluate the utility of that curve and thus select the best curve for a particular application. The following material supplements these References.

Reference 1 describes that, given an operating curve, we search over a pair of numbers G and $\zeta$, performing the computations given below. (In Reference No. 1, see section 3 in the vicinity of Eq. 15, and also Section 4. See also the Cookbook Summary in Appendix C). We have selected a metric T, for example one of those given in Eqs 7 through 11 of Reference 1. For each frequency m in the set of all frequencies at the filter plane, one then:

1. Computes $H^+$ as in Eq. 15 (It is a function of G and $\beta$); and
2. Determines the value $H^o$ on the curve that is closest by Euclidean measure in the complex plane to $H^+$.

The Cookbook summary of Appendix C of Reference 1 is repeated below since it provides a detailed and practical summary of the technique disclosed in Reference 1:

(1) Decide on a metric T. The general form is in Eq. (12) and some particular forms are in Table 1.

(2) For the metric, determine the partial derivative in the denominator of Eq. (15) even if the modulator is discrete. Obtain the necessary signal and noise quantities. (See the discussion of normalization in Appendix B). They are as follows: δ[hence S=A exp (jφ)], the as-encoded signal and its transform; $P_a$, the input noise power spectral density assuming additive wide-sense-stationary colored noise; $\sigma^2_d$ correlation detector noise.

(3) Understand the realizable values of the modulator H=M exp(jφ) in appropriate physical terms. See Appendix B.

(4) Achieve an algorithm that finds the Euclidean-closest realizable filter value, given an arbitrary location in the complex plane.

(5) From the histograms of signal's amplitude A and the filter's magnitude M, determine a search range of gain, $G_{min}$ to $G_{max}$. For example, if SNR is the metric, Eq. (15) indicates $G_{min}[A/P]_{max}=M_{min}$ and vice versa.

(6) The search range for output phase β is [0, 2 π) unless it can be restricted by other knowledge.

(7) Execute a two-dimensional search over G and β;
   (a) For each frequency m, calculate $H^+$ from Eq. (15) and set $H_m$ equal to the closest realizable filter value.
   (b) From the set $[H_m](G,\beta)$, calculate $T(G,\beta)$.

(8) Determine $G^*$ and $\beta^*$ that maximize T.

(9) Select $[H_m](G^*, \beta^*)$ as the filter.

In that manner one computes the optimal filter for the given pair (G,β), and one may evaluate the metric T(G,β) for that filter. The search over G and β is a finite search, and we select $G^*$ and $\beta^*$ that produce the largest value of T. This is describe in flowchart form in FIGS. 6A and 6B. Box 205 represents the search over G and β and items 1 and 2 above. Box 209 represents an evaluation of T(G,β) for the present operating curve. The loop represents the trial of all the operating curves, and the selection of the best of all of them.

One can generalize that procedure to include optimizing a filter over the other parameters that determine its operating curves. In the present case, one would ordinarily choose a parameter that is easily modified, the two simplest such being $V_b$ and $V_p$. In accordance with the present invention, we select operating curves by motorized control of $\Psi_p$ and $\Psi_a$, but the voltage control of polarization rotation devices either singly as in FIGS. 4A and 4B and 5C, or in the more complicated architectures of FIG. 7, could supplant the motor drive. Changing the other parameters from filter to filter does not consume a lot of data storage; typically there are between $128^2$=16,384 and $512^2$=262,144 filter values to store, and we are talking about adding another 1 to 4 stored values to select the operating curve.

So far only discrete operating curves have been considered: that is, those at specific orientations for the polarizer and analyzer. However, it can be shown that all of the available operating curves can be expressed in an analytic form by using the Jones calculus. This produces a two-by-two matrix which describes the polarizing nature of an optical element, in this case a liquid crystal video display. The Jones matrix can be evaluated by a series of empirical measurements, or by determining the values of some physical parameters to construct a physical model, as is set forth in the following articles which are incorporated herein by reference as if fully set forth:

REFERENCE 4: R. Clark Jones, "A New Calculus for the Treatment of Optical Systems VI. Experimental Determination of the Matrix", J. of the Opt. Soc. of Am. Vol. 37, pages 110–112 (1947);

REFERENCE 5: Khangua Lu and Bahaa E. A. Saleh, "Theory and Design of The Liquid Crystal TV and An Optical Spatial Phase Modulator", Opt. Eng., vol. 29, pages 240–246 (1990).

Once the Jones matrix has been determined for the filter modulator, further sets of operating curves for the liquid crystal video display can be investigated by the filter generation algorithm, thus extending the possibilities of modulation.

Figure 5E:
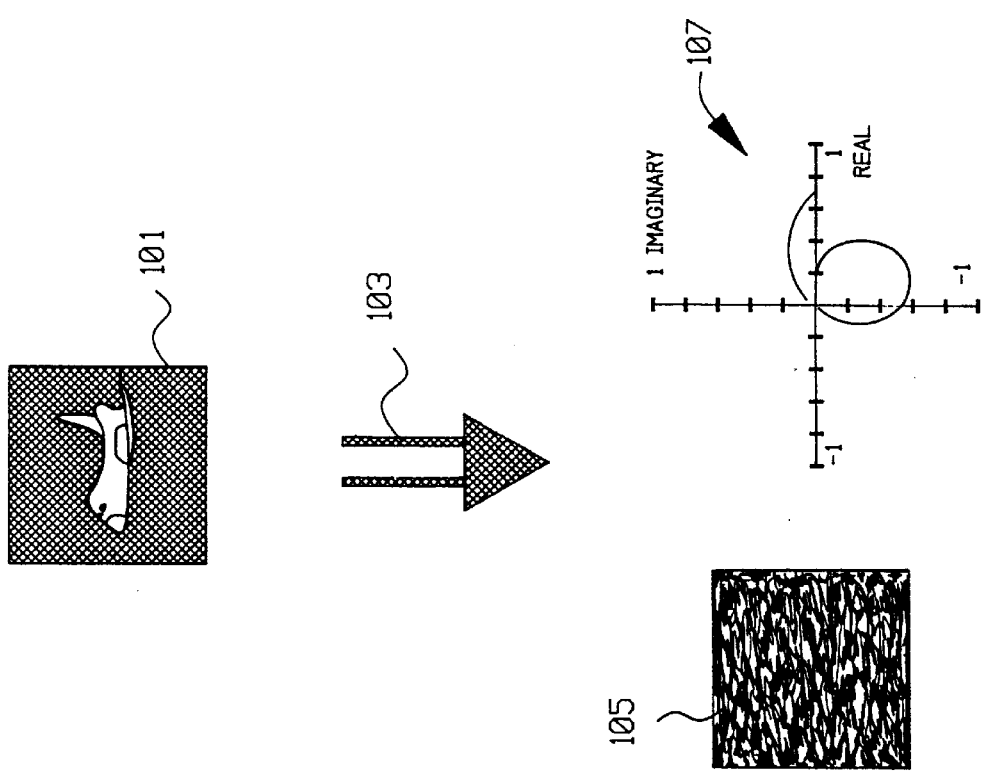
FIGS. 5D, 5E, and 5F depict the use of the optical correlator of FIGS. 4A and 4B in aircraft and spacecraft tracking operations.
Figure 5D:
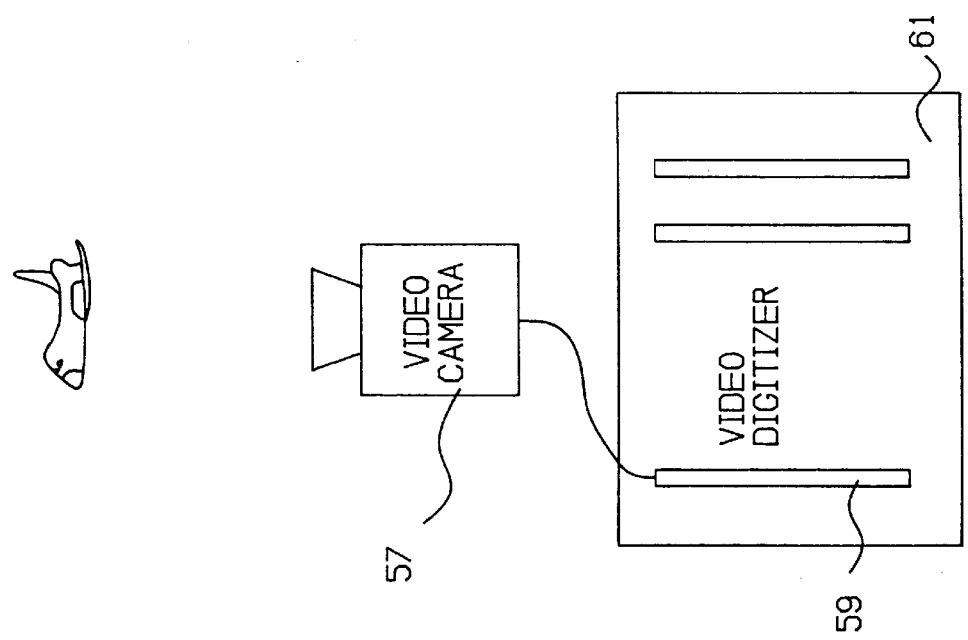
Figure 5F:
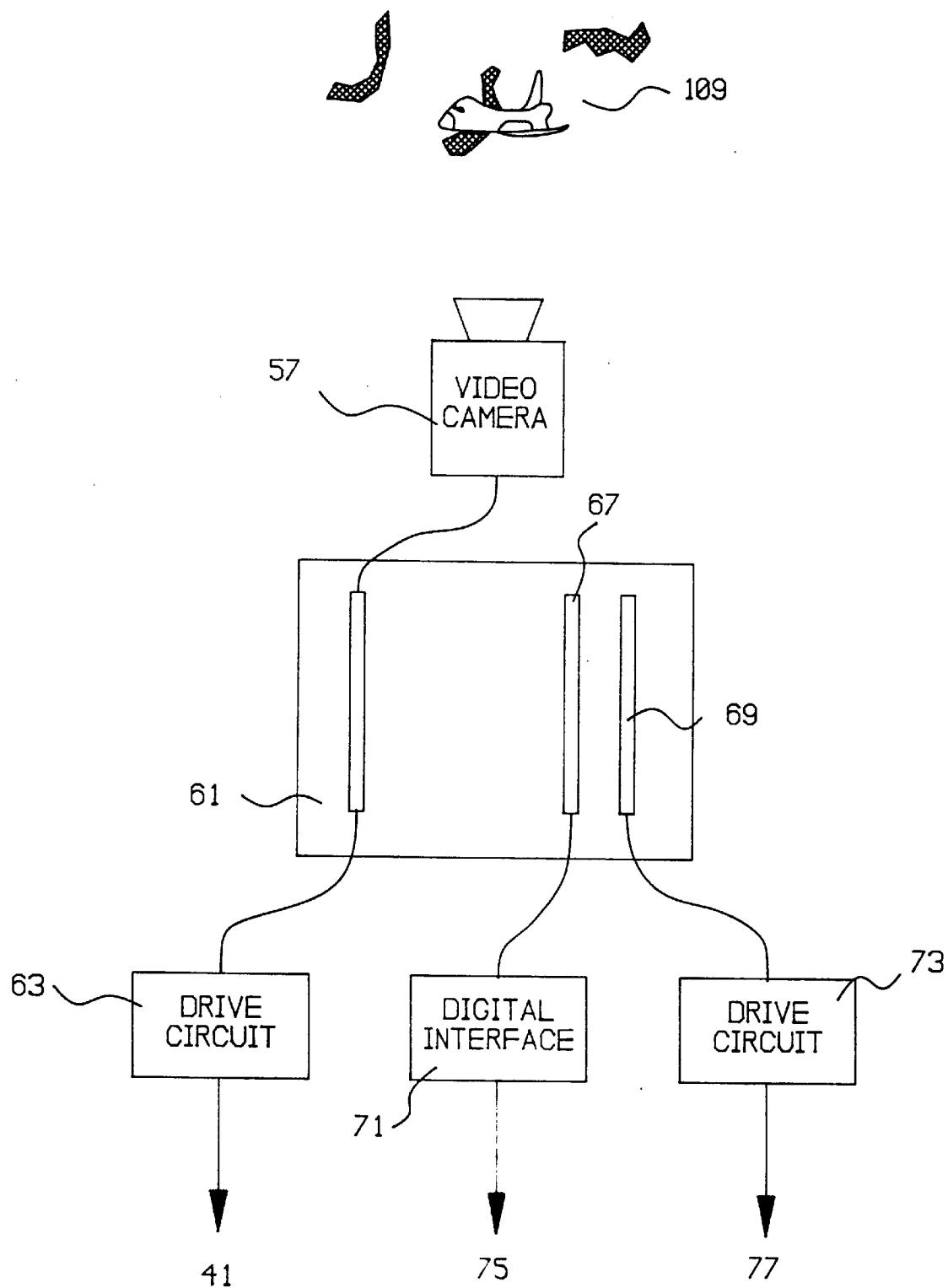

FIGS. 5D, 5E, and 5F depict the utilization of the present invention in the tracking of aircraft of spacecraft. As is shown in FIG. 5D, video camera 57 is utilized to acquire an image of the craft. Then, in accordance with FIG. 5E the digitally acquired image 101 is subjected to a filter generation software 103 to generate a set of filter drive signals 105 which, when implied to filter modulator 77 through drive circuitry 73, cause the correlator to "recognize" the craft. Next, as is depicted in FIG. 5F, the input image 108 of the craft is captured by video camera 57 and routed to video digitizer 61 which provides through drive circuit 63 of video image which is impressed upon a light beam. Additionally, a video digitizer 67 of personal computer 61 provides a signal to drive circuit 73 which is provided to a spatial light modulator (preferably a liquid crystal display 77) of filter modulator 43. Additionally, digital input/output card 67 of personal computer 61 provides a digital word to digital interface 71 which converts the digital word into an analog signal which alters the polarization affect of polarization rotation device 75.

The different sets of operating curves can be selected in an optical correlator system by using further embodiments of the invention. The first embodiment of the invention which has been discussed so far is depicted in FIG. 7A, and includes polarization rotation device 301, liquid crystal television 303, and analyzer 305. In a second embodiment of the invention, which is depicted in FIG. 7B, the spatial light modulator consists of an electrically actuable polarization rotation device 307, a liquid crystal television 309, and an electrically-actuable polarization rotation device 311. This device provides significant commercial advantage in that both the polarizer and analyzer are replaced with electrically-actuable polarization rotation devices. This configuration can access all of the operating curves which are possible with different orientations of linear polarization at the input and output of liquid crystal television 309. Note that polarization rotation device 311 is placed in the optical system facing the direction opposite from that of polarization rotation device 307; this is because the polarization rotation device has a linearly polarizing element on the input face of the polarization rotation device 307 itself. When such a rotator is substituted for an analyzer, this linearly polarizing element is required to be on the exit face of the device. The third embodiment of FIG. 7C includes an electrically-actuable polarization rotation device 313, electrically-actuable variable retarder 315, liquid crystal television 317, and analyzer 319. Preferably, a variable retarder such as those available from Meadowlark Optics is utilized and will utilize the same addressing mechanism as polarization rotation device 313. Thus, a digital word supplied to the interface unit of variable retarder 315 causes a specified differential wavefront retardance. The combination of the rotator 313 and the retarder 315 is capable of producing any arbitrary (elliptical, circular, or linear) polarization state of light. Thus, this configuration can produce operating curves which are a result of arbitrary input states of polarization. Note that the set of operating curves produced by this configuration would be different from those obtained with a system shown in FIGS. 7A and 7B.

Still another embodiment of the present invention is depicted in FIG. 7D, which includes an electrically-actuable polarization rotation device 321, an electrically-actuable variable retarder 323, a liquid crystal television 325, and a polarization rotation device 327.

A final embodiment of the present invention is depicted in FIG. 7E, and includes electrically-actuable polarization rotation device 329, electrically-actuable variable retarder 331, liquid crystal video display 333, electrically-actuable variable retarder 335, and electrically-actuable polarization rotation device 337. This configuration could be used as an electrically controlled polarimeter, which is a device that produces a full polarization characterization of an optical specimen, but which is not necessarily a liquid crystal video display. Such a polarimeter could be used for the calibration of optical components, or could be used to calculate the Jones matrix of an optical device. An electrically-controlled polarimeter would be much faster and potentially much cheaper than those prior art devices currently in use. This configuration could be used to maximize the light throughput of a filter modulator system, by permitting arbitrary states of polarization input to the liquid crystal video display and allowing the analysis for arbitrary polarization states leaving the liquid crystal video display 333. Although the configuration shown in FIG. 7E provides the full capability to control the input polarization and analyze the output polarization, it is also the most complicated of all these systems presented, as it requires four elements of polarization control. In practice, it will often be more advantageous to accept less flexibility in the control of the input and output polarization states and thus decrease the number of control parameters required. A wide selection of potential operating curves will still be possible using the simpler configurations presented to FIGS. 7A through 7D, and others that are not pictured here for example: (rotator, modulator, retarder, rotator); (rotator, modulator, retarder); or (polarizer, modulator, retarder, rotator).

A further advantage of the present invention is that of "tuning" a filter modulator's operating curve to one which previously specified. This is accomplished by adjusting the digital word sent to the two digital interface boards for the polarization rotators (in the case of the configuration shown in FIG. 7D), and then adjusting them until a "standard" performance of the correlator is achieved. In other words, a particular filter control is calculated for the correlator that gives a very specific response in the correlation output (for example, a dark spot at the center of the correlation plane). This filter control is written for the standard operating curve of the filter modulator, so that any deviation from this operating curve would produce a well characterized change in the output, such as a non-zero intensity at the center of the correlation plane. The polarization rotators are then be adjusted to reproduce the original response. This procedure helps to ensure reliable uniformity in the day-to-day operation of a correlator apparatus.

While the invention has been shown in only one of its forms, it is not thus limited but is susceptible to various changes and modifications without departing from the spirit thereof.

TABLE 1

| Optical Device | Orientation | Jones Matrix |
|---|---|---|
| Linear Polarizer | Horizontal Transmission | $\begin{bmatrix} 1 & 0 \\ 0 & 0 \end{bmatrix}$ |
| Linear Polarizer | Veritical Transmission | $\begin{bmatrix} 0 & 0 \\ 0 & 1 \end{bmatrix}$ |
| Linear Polarizer | Transmission at 45° angle | $\begin{bmatrix} 1 & \pm 1 \\ 1 & 1 \end{bmatrix}$ |
| Quarter-Wave Retarder | Fast Axis at Vertical | $\begin{bmatrix} 1 & 0 \\ 0 & -j \end{bmatrix}$ |
| Quarter-Wave Retarder | Fast Axis at Horizontal | $\begin{bmatrix} 1 & 0 \\ 0 & j \end{bmatrix}$ |
| Quarter-Wave Retarder | Fast Axis at 45° angle | $\begin{bmatrix} 1 & \pm j \\ \pm j & 1 \end{bmatrix}$ |
| Half-Wave Retarder | Fast Axis at either Horizontal or Vertical | $\begin{bmatrix} 1 & 0 \\ 0 & -1 \end{bmatrix}$ |
| Isotropic Retarder | | $\begin{bmatrix} e^{j\phi} & 0 \\ 0 & e^{j\phi} \end{bmatrix}$ |
| Relative Phase Changer | | $\begin{bmatrix} e^{j\phi_x} & 0 \\ 0 & e^{j\phi_y} \end{bmatrix}$ |
| Circular Polarizer | Right | $\frac{1}{2}\begin{bmatrix} 1 & j \\ -j & 1 \end{bmatrix}$ |
| Circular Polarizer | Left | $\frac{1}{2}\begin{bmatrix} 1 & -j \\ j & 1 \end{bmatrix}$ |

What is claimed is:

1. A method in an optical processing system of processing a light beam, comprising the method steps of:
   (a) providing at least one of the following optical processing devices:
      (i) an electrically-actuable polarizer unit which polarizes an incident light beam in a selected one of a plurality of available polarization states in response to receipt of at least a selected one of a plurality of available electrical command signals; and
      (ii) an electrically-actuable analyzer unit which selects from an incident light beam one of a plurality of available polarization states in response to receipt of at least a selected one of a plurality of available electrical command signals; and
   (b) providing the following optical processing devices;
      (i) a spatial light modulator for receiving an incident light beam and modulating said incident light beam by converting one polarization state into another in accordance with an optical polarazation transform associated with an operating range of at least one drive parameter; and
      (ii) a controller member for supplying control signals to at least one of (a) said electrically-actuable polarizer unit, and (b) said electrically-actuable analyzer unit, and for supplying at least one drive parameter value to said spatial light modulator;
   (c) passing said light beam through said spatial light modulator, and at least one of said electrically-actuable polarizer unit and said electrically-actuable analyzer unit;

17

(d) providing a particular optical processing objective to said controller member;

(e) utilizing said controller member to supply control signals to at least one of said electrically-actuable polarizer unit and said electrically-actuable analyzer unit, and to supply at least one drive parameter value to said spatial light modulator to obtain said optical processing objective without mechanical rotation of either of said electrically-actuable polarizer unit and said electrically-actuable analyzer unit.

2. A method in an optical processing system for processing a light beam, according to claim 1:

wherein said spatial light modulator comprises a pixelated birefringent medium; and wherein said spatial light modulator modulates said incident light.

3. A method in an optical processing system of processing a light beam, according to claim 1:

wherein said spatial light modulator comprises a pixelated birefringent medium; and wherein said spatial light modulator modulates said incident light on a pixel-by-pixel basis.

4. A method in an optical processing system of processing a light beam, according to claim 3:

wherein said pixelated birefringent medium comprises a liquid crystal video display; and wherein, during said step of utilizing said controller member, said controller member provides said at least one drive parameter in the form of at least one drive voltage to said liquid crystal video display.

5. A method in an optical processing system of processing a light beam, according to claim 1:

wherein said spatial light modulator defines a plurality of pixels; and wherein, during said step of utilizing said controller member, said controller member supplies at least one drive voltage to each pixel defined in said spatial light modulator in order to define, at least in-part, an optical polarization transform associated with each pixel.

6. A method in an optical processing system of processing a light beam, according to claim 5:

wherein each one of said plurality of pixels defined by said spatial light modulator may be defined by a Jones matrix optical polarization transform; and wherein, during said step of utilizing said controller member, said controller member supplies at least one drive voltage to each one of said plurality of pixels in order to provide a particular optical polarization transform at each pixel which may be defined by a Jones matrix, thus allowing independent control of each pixel in said spatial light modulator.

7. A method in an optical processing system of processing a light beam, according to claim 6:

wherein said Jones matrix for each pixel of said plurality of pixels defines a set of complex values which affects the polarization state of said incident light beam over an operating range for said at least one drive voltage for each pixel of said plurality of pixels of said spatial light modulator.

8. A method in an optical processing system of processing a light beam, according to claim 7:

wherein, in conjunction with at least one of said polarizer unit and said analyzer unit, said Jones matrix for each pixel defines a complex operating curve which affects both amplitude and phase of said incident light beam

18 over an operating range for said at least one drive voltage for each pixel of said plurality of pixels of said spatial light modulator.

9. A method in an optical processing system of processing a light beam, according to claim 1:

wherein said spatial light modulator operates on said light beam by receiving said incident light beam and modulating said incident beam, on a pixel-by-pixel basis, in accordance with an optical birefringent polarization transform associated with each pixel which may be described by a Jones matrix with four complex parameters; and wherein, during said step of utilizing said controller member, said controller member supplies said at least one drive parameter value to said spatial light modulator in order to determine said optical birefringent polarization transform at each pixel, in order to obtain said optical processing objective.

10. A method in an optical processing system of processing a light beam, according to claim 1:

wherein said electrically-actuable polarizer unit includes an electrically-actuable polarization rotation device which provides a selected one of a plurality of available linear polarization orientations in response to receipt of at least a selected one of a plurality of available electrical command signals;

wherein, during said step of utilizing said controller member, said controller member supplies at least one particular electrical command signal to said electrically-actuable polarization rotation device of said polarization unit in order to obtain said optical processing objective.

11. A method in an optical processing system of processing a light beam, according to claim 1:

wherein said electrically-actuable polarizer unit includes an electrically-actuable variable retarder which operates in response to receipt of at least a selected one of a plurality of available electrical command signals; and wherein, during said step of utilizing said controller member, said controller member supplies at least one particular command signal to said electrically-actuable variable retarder of said polarization unit in order to obtain said optical processing objective.

12. A method in an optical processing system of processing a light beam, according to claim 1:

wherein said electrically-actuable polarizer unit includes an electrically-actuable polarization rotation device which provides a selected one of a plurality of available linear polarization orientations in response to receipt of at least a selected one of a plurality of available electrical command signals;

wherein, during said step of utilizing said controller member, said controller member supplies at least one particular electrical command signal to said electrically-actuable polarization rotation device of said polarization unit in order to obtain said optical processing objective;

wherein said electrically-actuable polarizer unit includes an electrically-actuable variable retarder which provides a selected one of a plurality of available polarization states in response to receipt of at least a selected one of a plurality of available electrical command signals; and wherein, during said step of utilizing said controller member, said controller member supplies at least one particular command signal to said electrically-actuable variable retarder of said polarization unit in order to obtain said optical processing objective.

13. A method in an optical processing system of processing a light beam, according to claim 1:

wherein said electrically-actuable polarizer unit is a compound device which includes a polarizer, an electrically-controlled polarization rotator, and an electrically-controlled retarder; and wherein, during said step of utilizing, said electrically-actuable polarizer unit provides a selected one of a plurality of available polarization states in response to receipt of a selected set of a plurality of available electrical command signals from said controller member.

14. A method in an optical processing system of processing a light beam, according to claim 1:

wherein said electrically-actuable analyzer unit includes an electrically-actuable variable retarder which operates in response to receipt of at least a selected one of a plurality of available electrical command signals; and wherein, during said step of utilizing said controller member, said controller member provides at least one electrical command signal to said electrically-actuable variable retarder of said analyzer unit in order to obtain a particular optical processing objective.

15. A method in an optical processing system of processing a light beam, according to claim 1:

wherein said electrically-actuable analyzer unit includes an electrically-actuable polarization rotation device which operates in response to receipt of at least a selected one of a plurality of available electrical command signals; and wherein, during said step of utilizing said controller member, said controller member provides at least one electrical command signal to said electrically-actuable polarization rotation device of said analyzer unit in order to obtain a particular optical processing objective.

16. A method in an optical processing system of processing a light beam, according to claim 1:

wherein said electrically-actuable analyzer unit includes an electrically-actuable variable retarder which operates in response to receipt of at least a selected one of a plurality of available electrical command signals;

wherein, during said step of utilizing said controller member, said controller member provides at least one electrical command signal to said electrically-actuable variable retarder of said analyzer unit in order to obtain a particular optical processing objective;

wherein said electrically-actuable analyzer unit includes an electrically-actuable polarization rotation device which operates in response to receipt of at least a selected one of a plurality of available electrical command signals; and wherein, during said step of utilizing said controller member, said controller member provides at least one electrical command signal to said electrically-actuable polarization rotation device of said analyzer unit in order to obtain a particular optical processing objective.

17. A method in an optical processing system of processing a light beam, according to claim 1:

wherein said electrically-actuable analyzer unit is a compound device which includes an electrically-controlled retarder, and an electrically-controlled polarization rotator, and a polarizer; and wherein, during said step of utilizing, said analyzer unit passes light having a selected one of a plurality of available polarization states in response to receipt of at least a selected set of a plurality of available electrical command signals from said controller member.

18. A method in an optical processing system of processing a light beam according to claim 1, wherein, during said step of utilizing said controller member:

a plurality of preselected optical transforms, which can be obtained through electrical control of said electrically-actuable polarizer unit, said electrically-actuable analyzer unit, and said spatial light modulator, are successively examined by said controller, with respect to a predefined metric; and a particular one of said plurality of available optical transforms is selected for use by said controller member dependent upon satisfaction of said optical processing objective as determined from said predefined metric.

19. A method in an optical processing system of processing a light beam, according to claim 18:

wherein each of said plurality of preselected optical transforms is associated with at least one of:
 (a) a particular one of said plurality of available electrical command signals for said electrically-actuable polarizer unit; and
 (b) a particular one of said plurality of available electrical command signals for said electrically-actuable analyzer unit.

20. A method in an optical processing system of processing a light beam, according to claim 19, wherein each of said plurality of preselected optical transforms is further associated with:

(c) at least one particular value for said at least one drive parameter of said spatial light modulator.

21. A method in an optical processing system of processing a light beam, according to claim 20:

wherein said controller member provides at least one particular value for said at least one drive parameter of said spatial light modulator.

22. A method in an optical processing system of processing a light beam, according to claim 19:

wherein said controller member provides at least one of (a) a particular one of said plurality of available electrical command signals to said electrically-actuable polarizer unit, and (b) a particular one of said plurality of electrical command signals to said electrically-actuable analyzer unit, associated with a particular one of said plurality of available optical transforms which best satisfies said optical processing objective.

23. A method in an optical processing system of processing a light beam, according to claim 19:

wherein said controller member provides at least one of (a) a particular one of said plurality of available electrical command signals, to said electrically-actuable polarizer unit, (b) a particular one of said plurality of electrical command signals to said electrically-actuable analyzer unit, at least one particular value for said at least one drive parameter of said spatial light modulator, associated with a particular one of said plurality of available optical transforms which best satisfies said optical processing objective.

24. An optical processing apparatus for modulating a light beam, comprising:

a polarizer unit which polarizes said light beam in a selected one of a plurality of available polarization states in response to receipt of at least a selected one of a plurality of available electrical command signals; and a spatial light modulator for receiving said light beam and modulating said light beam by converting one polarization state into another in accordance with an optical polarization transform associated with an operating range of at least one drive parameter; and an analyzer unit which selects from said light beam one of a plurality of available polarization states in response to receipt of at least a selected one of a plurality of available electrical command signals; and a controller member for supplying control signals to at least one of (a) said polarizer unit, and (b) said analyzer unit, and for supplying at least one drive parameter value to said spatial light modulator;

wherein, during a modulation mode of operation:

said controller member is utilized to supply control signals to at least one of said polarizer unit and said analyzer unit, and to supply at least one drive parameter value to said spatial light modulator to obtain said optical processing objective without mechanical rotation of either of said electrically-actuable polarizer unit and said electrically-actuable analyzer unit.

25. An optical processing apparatus for modulating alight beam, according to claim 24:

wherein said spatial light modulator comprises a birefringent medium; and wherein said spatial light modulator modulates said incident light.

26. An optical processing apparatus for modulating a light beam, according to claim 24:

wherein said spatial light modulator comprises a pixelated birefringent medium; and wherein said spatial light modulator modulates said incident light on a pixel-by-pixel basis.

27. An optical processing apparatus for modulating a light beam, according to claim 24:

wherein said pixelated birefringent medium comprises a liquid crystal video display; and wherein said controller member provides said at least one drive parameter in the form of at least one drive voltage to said liquid crystal video display.

28. An optical processing apparatus for modulating a light beam, according to claim 24:

wherein said spatial light modulator defines a plurality of pixels; and wherein said controller member supplies at least one drive voltage to each pixel defined in said spatial light modulator in order to define, at least in-part, an optical polarization transform associated with each pixel.

29. An optical processing apparatus for modulating a light beam, according to claim 28:

wherein each one of said plurality of pixels defined by said spatial light modulator may be defined by a Jones matrix optical polarization transform; and wherein said controller member supplies at least one drive voltage to each one of said plurality of pixels in order to provide a particular optical polarization transform at each pixel which may be defined by a Jones matrix, thus allowing independent control of each pixel in said spatial light modulator.

30. An optical processing apparatus for modulating a light beam, according to claim 29:

wherein said Jones matrix for each pixel of said plurality of pixels defines a set of complex values which affects the polarization state of said incident light beam over an operating range for said at least one drive voltage for each pixel of said plurality of pixels of said spatial light modulator.

31. An optical processing apparatus for modulating a light beam, according to claim 30:

wherein, in conjunction with at least one of said polarizer unit and said analyzer unit, said Jones matrix for each pixel defines a complex operating curve which affects both amplitude and phase of said incident light beam over an operating range for said at least one drive voltage for each pixel of said plurality of pixels of said spatial light modulator.

32. An optical processing apparatus for modulating a light beam, according to claim 24:

wherein said spatial light modulator operates on said light beam by receiving said incident light beam and modulating said incident beam, on a pixel-by-pixel basis, in accordance with an optical birefringent polarization transform associated with each pixel which may be described by a Jones matrix with four complex parameters; and wherein said controller member supplies said at least one drive parameter value to said spatial light modulator in order to determine said optical birefringent polarization transform at each pixel, in order to obtain said optical processing objective.

33. An optical processing apparatus for modulating a light beam, according to claim 29:

wherein said polarizer unit includes an electrically-actuable polarization rotation device which provides a selected one of a plurality of available linear polarization orientations in response to receipt of at least a selected one of a plurality of available electrical command signals;

wherein said controller member supplies at least one particular electrical command signal to said electrically-actuable polarization rotation device of said polarization unit in order to obtain said optical processing objective.

34. An optical processing apparatus for modulating a light beam, according to claim 24:

wherein said polarizer unit includes an electrically-actuable variable retarder which operates in response to receipt of at least a selected one of a plurality of available electrical command signals; and wherein said controller member supplies at least one particular command signal to said electrically-actuable variable retarder of said polarization unit in order to obtain said optical processing objective.

35. An optical processing apparatus for modulating a light beam, according to claim 24:

wherein said polarizer unit includes an electrically-actuable polarization rotation device which provides a selected one of a plurality of available linear polarization orientations in response to receipt of at least a selected one of a plurality of available electrical command signals;

wherein said controller member supplies at least one particular electrical command signal to said electrically-actuable polarization rotation device of said polarization unit in order to obtain said optical processing objective;

wherein said polarizer unit includes an electrically-actuable variable retarder which provides a selected one of a plurality of available polarization states in response to receipt of at least a selected one of a plurality of available electrical command signals; and wherein said controller member supplies at least one particular command signal to said electrically-actuable variable retarder of said polarization unit in order to obtain said optical processing objective.

36. An optical processing apparatus for modulating a light beam, according to claim 24:

wherein said polarizer unit is a compound device which includes a linear polarizer, an electrically-controlled polarization rotator, and an electrically-controlled retarder; and wherein said polarizer unit provides a selected one of a plurality of available polarization states in response to receipt of a selected set of a plurality of available electrical command signals from said controller member.

37. An optical processing apparatus for modulating a light beam, according to claim 24:

wherein said analyzer unit includes an electrically-actuable variable retarder which operates in response to receipt of at least a selected one of a plurality of available electrical command signals ; and wherein said controller member provides at least one electrical command signal to said electrically-actuable variable retarder of said analyzer unit in order to obtain a particular optical processing objective.

38. An optical processing apparatus for modulating a light beam, according to claim 24:

wherein said analyzer unit includes an electrically-actuable polarization rotation device which operates in response to receipt of at least a selected one of a plurality of available electrical command signals; and wherein said controller member provides at least one electrical command signal to said electrically-actuable polarization rotation device of said analyzer unit in order to obtain a particular optical processing objective.

39. An optical processing apparatus for modulating a light beam, according to claim 24:

wherein said analyzer unit includes an electrically-actuable variable retarder which operates in response to receipt of at least a selected one of a plurality of available electrical command signals;

wherein said controller member provides at least one electrical command signal to said electrically-actuable variable retarder of said analyzer unit in order to obtain a particular optical processing objective;

wherein said analyzer unit includes an electrically-actuable polarization rotation device which operates in response to receipt of at least a selected one of a plurality of available electrical command signals; and wherein said controller member provides at least one electrical command signal to said electrically-actuable polarization rotation device of said analyzer unit in order to obtain a particular optical processing objective.

40. An optical processing apparatus for modulating a light beam, according to claim 24:

wherein said analyzer unit is a compound device which includes an electrically-controlled retarder, and an electrically-controlled polarization rotator, and a linear polarizer; and wherein said analyzer unit passes light having a selected one of a plurality of available polarization states in response to receipt of at least a selected set of a plurality of available electrical command signals from said controller member.

* * * * *